(12) United States Patent
Narayanan

(10) Patent No.: US 10,140,292 B2
(45) Date of Patent: Nov. 27, 2018

(54) DEVICE AND COMPUTERIZED METHOD FOR PICTURE BASED COMMUNICATION

(71) Applicant: AVAZ, INC., Palo Alto, CA (US)

(72) Inventor: Ajit Narayanan, Chennai (IN)

(73) Assignee: AVAZ, INC., Palo Alto, CA (US)

( * ) Notice: Subject to any disclaimer, the term of this patent is extended or adjusted under 35 U.S.C. 154(b) by 0 days.

(21) Appl. No.: 15/417,201

(22) Filed: Jan. 26, 2017

(65) Prior Publication Data
US 2017/0337191 A1 Nov. 23, 2017

Related U.S. Application Data

(63) Continuation-in-part of application No. 14/827,203, filed on Aug. 14, 2015, now abandoned.

(30) Foreign Application Priority Data

Aug. 14, 2014 (IN) .......................... 3990/CHE/2014

(51) Int. Cl.
*G06F 17/20* (2006.01)
*G06F 17/28* (2006.01)
*G06F 17/27* (2006.01)

(52) U.S. Cl.
CPC ...... *G06F 17/2881* (2013.01); *G06F 17/2755* (2013.01); *G06F 17/2785* (2013.01); *G06F 17/289* (2013.01); *G06F 17/2863* (2013.01)

(58) Field of Classification Search
CPC ........ G06F 17/20; G06F 17/21; G06F 17/212; G06F 17/2241; G06F 17/2247; G06F 17/27; G06F 17/2705; G06F 17/274; G06F 17/275; G06F 17/2765; G06F 17/2785; G06F 17/279; G06F 17/28; G06F 17/2872; G06F 17/2881; G06F 17/289
USPC ................................. 704/1, 2, 3, 4, 8, 9, 10
See application file for complete search history.

(56) References Cited

U.S. PATENT DOCUMENTS

2004/0078193 A1* 4/2004 Masuichi ............ G06F 17/2881
704/9
2012/0330669 A1* 12/2012 Narayanan .............. G10L 21/06
704/271

* cited by examiner

*Primary Examiner* — Qi Han

(57) ABSTRACT

The embodiments herein achieve a picture based communication system. The system allows users option to select one or more pictures, and any associated attributes. The selection of one or more pictures, and any associated attributes is taken as input. The selected words and attributes are converted to a graph representation, and subsequently the graph representation is converted to a sentence in target language. The method further involves predicting new relations, words, and attributes for further selection by user.

42 Claims, 32 Drawing Sheets

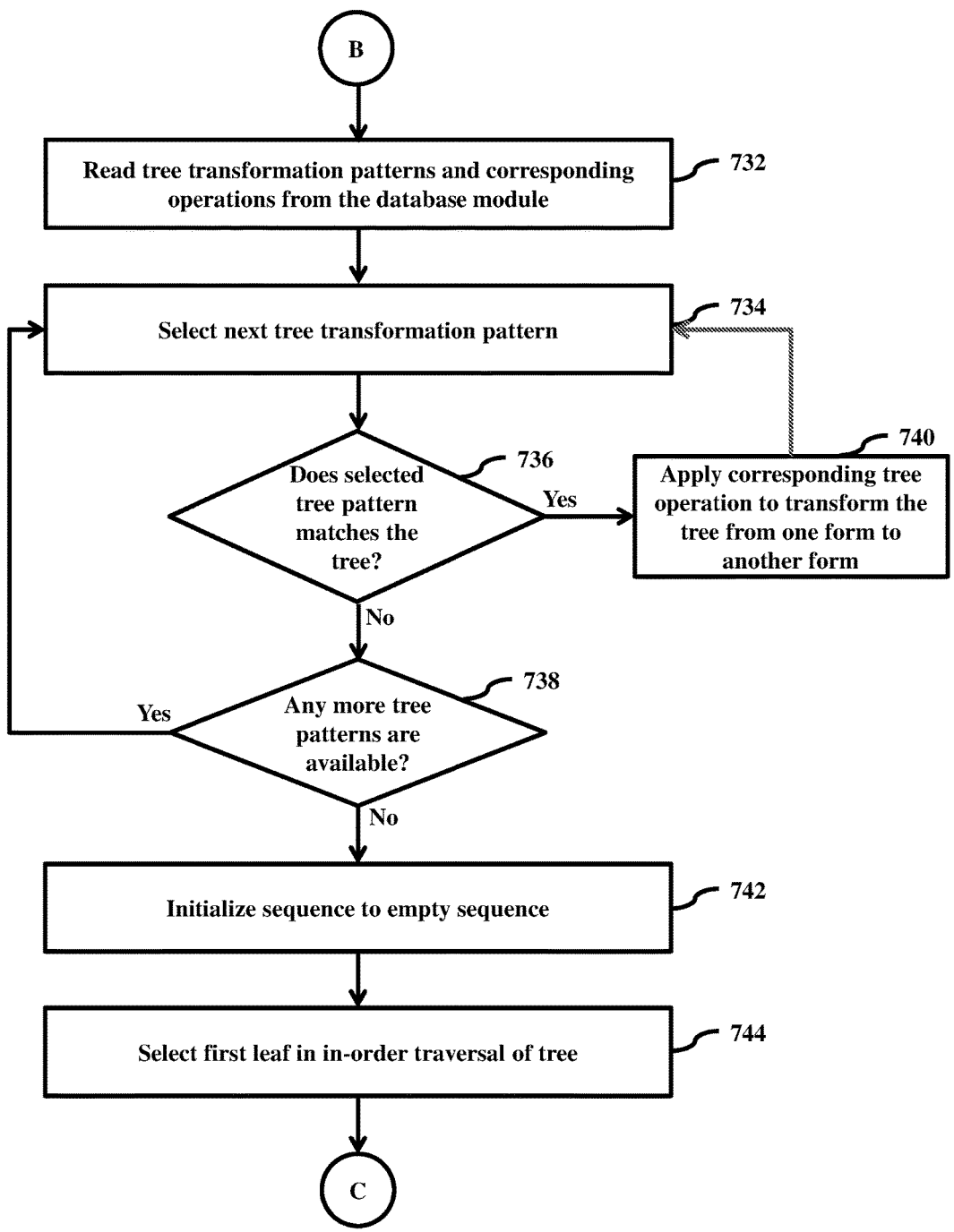

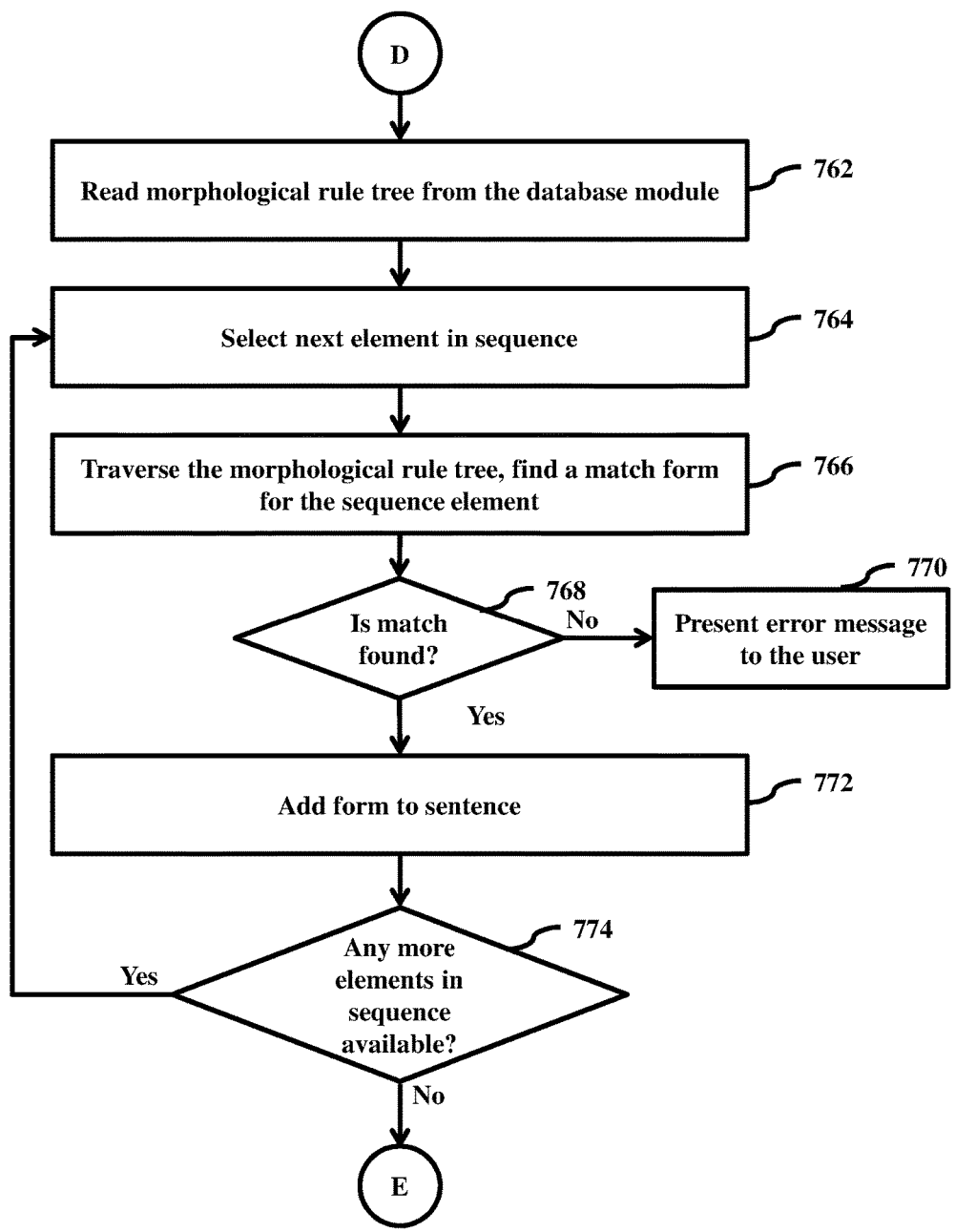

DEVICE AND COMPUTERIZED METHOD FOR PICTURE BASED COMMUNICATION

This application is a continuation-in-part of application Ser. No. 14/827,203, filed Aug. 14, 2015, which claims the benefit of India Provisional Application No. 3990/CHE/2014, filed Aug. 14, 2014.

TECHNICAL FIELD

This invention relates to language conversion systems, and more particularly to a device and computerized method for picture based communication.

BACKGROUND

Natural Language (NL) and its use are daily matters for every human being. Linguistics, the study of NL, is a well-established discipline. Machine Translation (MT), the use of computer to translate texts between NLs, has been researched from decades soon after the birth of computer. Augmentative and Alternative Communication (AAC), the use of computer to communicate especially for persons with disabilities, has also been researched for several decades.

Right after the start of MT research, proposals and discussions were made for an Interlingua Method (IM) of MT. An interlingua is an artificial language that usually acts as an intermediary language in machine translation—where, instead of translating one language to another directly, a translation is first done to the intermediary language and then from the intermediary language to the target language. The interlingua usually attempts to capture meaning or semantic information, and such interlingua is called a semantic interlingua. For a brief discussion of a picture-based semantic interlingua, reference is made to U.S. Pat. No. 8,712,780 to Ajit Narayanan. (Dec. 8, 2010), entitled "Systems and methods for picture based communication".

As a picture-based interlingua is arguably easier to learn and manipulate than the NLs for persons who do not know the NL fluently, and as the interlingua can be converted technically into the NL, many different systems and methods are proposed to convert the interlingua into the NL. These find applications in language learning and in AAC.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which:

FIGS. 7A to 7F show a flow chart illustrating a method for sentence generation as implemented in the sentence generation module, according to an embodiment of the present invention as disclosed herein;

DETAILED DESCRIPTION OF INVENTION

Figure 1:
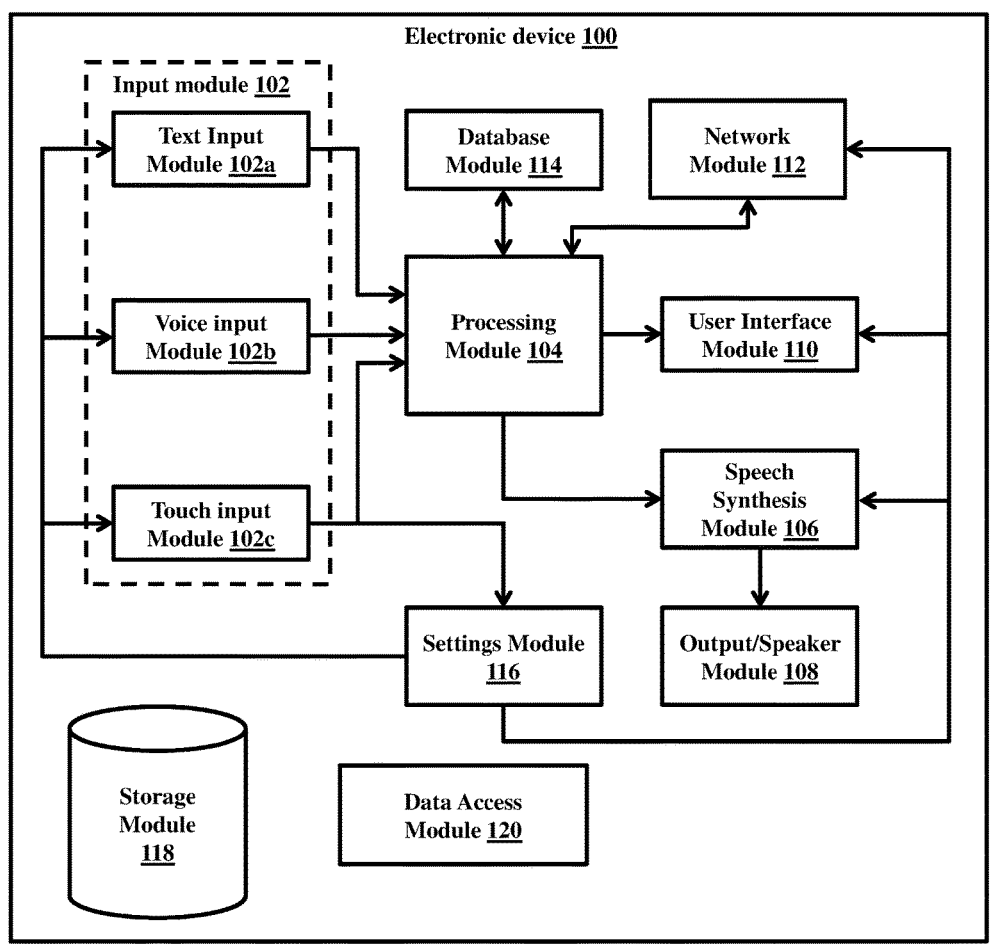
FIG. 1 is a block diagram illustrating various modules of an electronic device, according to an embodiment of the present invention as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits or the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention.

The embodiments herein achieve a system and a computerized method for picture based communication through application of various rules. The rules can be specific to target NL, and are applied through a cascade of rule engines.

An interlingua is an artificial language that can act as an intermediary language in machine translation, whereby, instead of translating one language to another directly, a translation is first performed to the intermediary language and then from the intermediary language to the target language. Interlingua is also used in Augmentative and Alternative Communication (AAC) where people who have difficulties communicating in particular languages or using natural speech use a computer to communicate. In many applications of AAC, the users are persons with disabilities. For a subset of these individuals, the inability to communicate is a result of impairment in language processing, and the use of a picture-based communication system to communicate results in higher communication function. A picture based semantic interlingua is a way for AAC users to communicate in pictures with similar expressive capability as communicating with words.

The interlingua used herein includes four different components, which are strung together to create a sentence. The components are:
1 Word senses: A word sense represents a unique meaning associated with a word. This is assigned a unique identifier which is read from a dictionary. When applied to picture-based communication, a word sense is associated with a picture.
2 Relations: Relations establish a unique, one-to-one relationship between two words, and are directional in nature.
3 Attributes: Attributes associated with a word reflect shades of a meaning associated with the word like tense, aspect, modality, number, gender, or the like.
4 Sub-graphs: Sub-graphs represent groups of words such as phrases and clauses which act as a single word. A sub-graph is also known as and referred to as a scope.

The interlingua can be represented as a hyper-graph, with words forming nodes, being annotated by attributes, and edges being relations. Sub-graphs contain their own internal nodes with attributes and relations. Pronouns are all represented with the generic word "PRO (00)". This is true for all personal, interrogative and relative pronouns. And all non-polar questions are represented with the generic question pronoun "Q (00.@wh)".

In an embodiment, the semantic interlingua format used is Universal Networking Language (UNL).

The computerized method for picture based communication disclosed herein includes presenting, by a user interface module, picture words to a user on a screen of a device (i.e., electronic device). Further, the method includes receiving, by the user interface module, at least one picture word selected by the user and its attributes. Further, the method includes constructing, by a graph generation module, at least one connected graph in semantic interlingua, where the at least one connected graph is made of words and relationships with the selected at least one picture word. Further, the method includes generating, by a sentence generation module, a sentence in at least one target language based on the at least one connected graph. Further, the method includes communicating, by an output module, the sentence in the at least one target language to a party receiving the communication on the electronic device in a mode as configured by the user, where the at least one target language is based on an input representing mode of communication received from the user.

In an embodiment, the method includes predicting, by a prediction module, relations, words and attributes based on the sentence, where the prediction includes determining feasible attributes to a selected word from the sentence, determining feasible relations to the selected word, and determining feasible words for at least one relation from the feasible relations, where the predicted relations, words, and attributes are presented to the user for further selection to construct a sentence.

In an embodiment, at least one of probabilities and statistics are derived from the sentence to incorporate into a database for future use by the prediction module.

In an embodiment, the method includes determining a list of attributes relevant to a word based on the at least one selected picture word, presenting the list of attributes to the user on the screen of the electronic device, receiving at least one attribute selected by the user from the list of attributes, adding the at least one selected attribute to the word, and updating the at least one connected graph with the at least one selected attributes.

In an embodiment, the method further includes determining a list of attributes relevant to the sentence, presenting the list of attributes to the user on the screen of the electronic device, receiving at least one attribute selected by the user from the list of attributes, adding the at least one selected attribute to the sentence, and updating the at least one connected graph with the at least one selected attribute. In a preferred embodiment, the mode of communication is at least one among audio, visual, and audio visual.

In an embodiment, the method includes converting, by a speech synthesis module, a selected picture word's target language label into a speech signal, and producing, by the output module, a voice output for the speech signal.

In an embodiment, the method further includes converting, by a speech synthesis module, the sentence into a speech signal by a speech synthesis module, and producing, by the output module, voice output for the speech signal, where the voice output is provided based on user configuration of output mode.

In an embodiment, the method further includes sending output of the sentence to another user device connected to the device in a network.

In an embodiment, the method further includes adding new words to the lexical database by the user through a user interface of the device.

In an embodiment, the method further includes editing existing words to the lexical database through a user interface of the device.

In an embodiment, the method further includes communicating an output in at least two target language in a sequential manner.

In an embodiment, generating the sentence from the at least one connected graph includes generating a graph representation from the connected graph in the semantic interlingua using at least one graph rule applied by a rule engine. Further, the method includes generating separate tree representations based on an analysis of the graph representation, where the nodes in the graph representation are analyzed based on at least one graph to tree rule applied by the rule engine. Further, the method includes generating a cumulative tree representation based on an analysis of the separate representations, where the nodes in the separate representations and graph representation are analyzed based on at least one tree rule applied by the rule engine. Furthermore, the method includes transforming the tree representation into the sentence in the at least one target language, where the tree representation is transformed based on at least one sequence transformation rule applied by the rule engine.

In an embodiment, the graph representation described herein includes a plurality of graph nodes indicating at least one of a word sense with annotations, a set of attributes, a special identifier indicating a sub-graph, and a list of edges. Each graph node is associated with a dictionary entry, where the dictionary entry includes at least one of root form of the word sense, morphological properties, parts of speech, semantic attributes, and framing structure. The set of attributes associated with each graph node in the graph representation defines a semantic transformation of the graph node, using which the set of attributes associated with each graph node can be normalized based on at least one attribute rule. The plurality of nodes includes an entry node representing an entry-point for parsing the sentence.

In an embodiment, generation of the graph representation from the connected graph in the semantic interlingua using at least one graph rule from the rule engine includes enumerating all sub-graphs, creating an empty graph for each of the sub-graphs, converting each node of an edge in the connected graph into the corresponding node in the sub-graph when either endpoints are not pronouns, converting each node of an edge into a unique node when either endpoints are pronouns, where each of the edge includes at least two nodes, creating a map for mapping node identifiers to each of the node; setting an entry point for each of the sub-graph, and adding the edge as a relation to the at least two nodes.

In an embodiment, at least one of the word sense, annotations, set of attributes, special identifier indicating sub-graph, and list of edges associated with each graph node in the graph representation defines a transformation of the graph node, where the graph node or graph structure is modified based on at least one graph rule. In an embodiment, the graph rule includes a pattern that specifies that an attribute is one of, exactly one of, or a maximum of one of a given list of attributes. In another embodiment, the graph rule includes graph pattern, constraints on the pattern, and output operation.

In an embodiment, modifying the graph representation based on the analysis of the graph representation includes traversing the graph representation node-by-node, where the graph representation is traversed from an entry node and proceeding outwards along edges, selecting edges in the graph representation from among those which create a cycle in the graph, or which cause an entry node to have at least one input edge, cause a node that is not an entry node to have two or more input edges, and cause a node to have more than one input edges of give type; and forming the selected edges, breaking edges having a start node, an end node, and a relation.

In an embodiment, breaking edges includes removing the relation from the graph representation, duplicating the end node of the edge, marking the duplicate node with a pronoun attribute, connecting the duplicate node to the start node, where the edge is broken into the start node and the duplicate, and the end-node along with rest of the graph representation, and determining whether resulting graph representation is one of connected and broken into two fragments by the edge-breaking.

In an embodiment, the method further includes inferring a pronoun when the resulting graph is determined as connected.

In an embodiment, the method further includes inferring a relative clause when the resulting graph is determined as fragment.

In an embodiment, the separate and cumulative tree representations includes a constrained tree representation called an xtree structure, representing a syntactic structure, where the xtree structure includes at least one of a maximal projection node, at least one of an intermediate projection node, and a head node, pointers, and properties for the tree representation. Each node of the xtree structure is associated with at least one of a label representing the node position in the xtree representation, a link to the tree representation to which the tree node belongs, and morphological properties of a word. The tree representation includes a trace to another part, where the trace to another part is represented by having a maximal projection node.

In an embodiment, operations performed on the tree representation includes at least one of initializing with a pattern, substitution of a tree, adjunction of a tree, detachment and movement of a sub-tree from one location to another using at least one movement rule, leaf traversal and application of a function with accumulation of result.

In an embodiment, the at least one graph to tree rule is defined using at least one of an edge pattern in the graph representation, two node patterns in the graph representation, an output pattern in the tree representation, and an output variable in the tree representation. The at least one tree rule is applied by traversing the graph representation in an order of edge types, and checking each edge against a list of patterns of all possible graph-to-tree rules.

In an embodiment, a graph to tree rule check is performed between corresponding entry nodes of the sub-graph, when a sub-graph is encountered. The tree rules pairwise coalesce separate tree and graphs in the graph representations to create the cumulative tree representation that includes all the separate sub-trees in various substitution and adjunction positions. The sentence is defined as a top-most tree represented as xtree whose maximal projection node is of type Complementarizer.

In an embodiment, the Complementarizer xtree is followed by a sequence of xtrees whose maximal projection are of type Inflection which end in an xtree whose maximal projection is of type Verb, where head node of the Verb xtree is a main verb of the sentence.

In an embodiment, the Complementarizer xtree is created for a full sentence by searching for a pattern in the tree representation, where the pattern is in given chain within the tree representation, which matches given constraints on the pattern, performing a tree transformation operation on the sentence, and appending a terminal punctuation to the sentence.

In an embodiment, performing the tree transformation pattern operation on the sentence includes at least one of performing no operation, moving a node from one location to another location of the sub-tree, and creating the Complementarizer xtree with given template.

In an embodiment, the at least one movement rule includes pattern to find source of movement, pattern to find destination of movement, and operation to be performed if both source and destination patterns are found.

In an embodiment, operation to be performed if both source and destination patterns are found is one of movement of sub-tree to a given vacant node, movement of head to a given head node, copying properties from one tree structure to another, setting properties on given tree structure, removal of sub-tree, and changing the word of a sub-tree.

In an embodiment, transforming the cumulative tree representation into a sentence of the target language includes generating a sequence of words representing the sentence based on the tree representation, where the sequence of words is generated by in-order traversal of the leaves of the cumulative tree representation, and converting the sequence of words into a sentence of the target language using the at least one sequence transformation rule, where the sequence transformation rule operates on a list of words excluding punctuation marks.

In an embodiment, the sequence transformation rule includes pattern to search, and at least one output operation, where the pattern to search consists of a regular expression matching at least one element of the sequence, and where output operation is at least one of substitution of a word or set of words in the sequence by another word, deletion of a word or set of words in the sequence, addition of at least one word to the sequence, and rearrangement of words in the sequence, when the natural language is English.

In various embodiments, removal of loops and cycles from the graph based on the analysis of the graph representation includes traversing the graph representation node-by-node, the graph representation being traversed from an entry node and proceeding outwards along edges; selecting an edge to break to remove loops and cycles from the graph representation; and breaking edge having a start node, an end node, and a relation. In an embodiment, the conditions for selecting an edge to break the graph representation includes checking if an entry node has an incoming edge, or if a non-entry node has more than one incoming edge, or if a circular loop is detected in the graph. In an embodiment, the breaking of at least one edge (having a start node, an end node and a relation) includes removing the relation from the graph representation; duplicating the end node of the edge; making the duplicate node a pronoun; connecting the duplicate node to the start node; and determining whether resulting graph representation is connected or broken into two fragments by the edge-breaking.

Furthermore, the method includes communicating the sentence of target language to a party by a user interface module, the target language is based on an input representing mode of communication. In an embodiment, the mode of communication is at least one of an audio, a visual, and an audio visual formats.

The proposed system and method can be used in any conversion system for converting the interlingua (visual or intermediate language) into any set of natural languages. Unlike the conventional systems and methods, the proposed conversion system and method is capable of converting a large class of generic, semantically-oriented interlingua into any natural language. The interlingua is arguably easier to learn and manipulate than natural languages; and it can be converted technically into any natural language. Such an interlingua, along with the conversion technique, finds use in a number of applications. These applications include second language teaching to persons with speech, communication, or language disabilities, language difficulties, language-independent, or precise human-human or human-machine communication, dyslexia or illiteracy, to communicate effectively. Further, the proposed method may be incorporated on PCs, mobile devices or may be an application running on a remote system which allows for language-independent messages to be constructed, which can be de-constructed into any language on the receiver's side.

Thus, advantages of one or more aspects of Interlingua approach and its conversion to natural language are well-known. Other advantages of one or more aspects will become apparent from a consideration of the ensuing description and accompanying figures.

Referring now to the drawings, and more particularly to FIGS. 1 through 12H, where similar reference characters denote corresponding features consistently throughout the figures, there are shown preferred embodiments. More specifically, the system and computerized-methods for conversion of interlingua to NL using the various rules through the cascade of rules engines are illustrated using example embodiments.

FIG. 1 is a block diagram illustrating various modules of an electronic device 100, according to an embodiment of the present invention as disclosed herein. In an embodiment, the electronic device 100 can be for example, but is not limited to, a personal computer, a laptop, a personal digital assistance, a communicator, a server, a tablet, a phablet, or the like. The electronic device 100 described herein reflects a conversion system capable of converting a large class of generic, semantically-oriented interlingua into any natural language locally or remotely using an application running on a remote system which allows for language-independent messages to be constructed and de-constructed into any language on the receiver's side.

In an embodiment, the electronic device 100 can be configured to include an input module 102, a processing module 104, a speech synthesis module 106, an output/speaker module 108, a user interface module 110, a network module 112 (or network communication module), a database module 114, settings module 116, a storage module 118, and a data access module 120. The input module 102, for example, includes a text input module 102a, a voice input module 102b, and a touch input module 102c.

The user interface module 110 can be configured to present picture words to a user on a screen of the electronic device 100 (i.e., device). Further, the user interface module 110 can be configured to receive at least one picture word selected by the user. In an example, the user uses the user interface module 110, either touch screen/mouse/keyboard, or the like to select the at least one picture word. The processing module 104 can be configured to construct at least one connected graph in semantic interlingua, where the at least one connected graph is made of words and relationships with the selected at least one picture word. Further, the processing module 104 can be configured to generate a sentence in at least one target language based on the at least one connected graph. The network module 112 can be configured to send the sentence to another user or to the speech synthesis module 106. Further, the output/speaker module 108 can be configured to communicate the sentence in the at least one target language to a party receiving the communication on the electronic device 100 in a mode as configured by the user, where the at least one target language is based on an input representing mode of communication received from the user. Further, the functionalities of the processing module 104 are explained in conjunction with FIG. 2.

In an embodiment, the speech synthesis module 106 can be configured to convert a selected picture word's target language label into a speech signal. The output/speaker module 108 can be configured to produce a voice output for the speech signal. In another embodiment, the speech synthesis module 106 can be configured to convert the sentence into a speech signal. The output/speaker module 108 can be configured to produce voice output for the speech signal, wherein the voice output is provided based on user configuration of output mode. The user is able to switch between different languages through the settings module 116, which may trigger multiple simultaneous output generation modules in parallel to get output sentences in multiple languages. The processing module 104 learns new probabilities or statistics from the sentence to incorporate into the database module 114.

The input module 102 is configured to provide input to the system. For the sake of simplicity, the various example embodiments herein assume that the input is a single sentence. However, as would be appreciated by an ordinary person skilled in the art, the system is not limited to a single sentence input.

In an embodiment, the input module 102 may be configured to construct an input sentence based on touch input received in the form of a set of pictures selected by a user using the electronic device 100. For a brief discussion of a picture-based semantic interlingua, reference is made to U.S. Pat. No. 8,712,780 to Ajit Narayanan. (Dec. 8, 2010), entitled "Systems and methods for picture based communication". As shown in the FIG. 1, in an example, the text input module 102a can be configured to construct the input sentence based on the text input received in the form of the pictures selected by the user. In another example, the voice input module 102b can be configured to construct the input sentence based on the voice input received in the form of the pictures selected by the user. In another example, the touch input module 102c can be configured to construct the input sentence based on the touch input received in the form of the pictures selected by the user.

The data access module 120 provides access to the data stored in the storage module 118. The data access module 120 performs marshalling and un-marshalling of data in specific representation formats as required by various other modules of the electronic device 100.

In a preferred embodiment, there are three different representations that are used in the conversion system:

1. The structure of interlingua, representing the semantic meaning of the sentence (hereinafter referred to as "G" for graph).
2. An internal representation (hereinafter referred to as "X" for xtree) representing the syntactic structure of the sentence of the target language to which the interlingua is converted.
3. A sequence of words in the target language (hereinafter referred to as "S" for sequence).

In a preferred embodiment, G is a graph-language representation called Universal Networking Language (UNL), the data-structure X is a tree, and the data-structure S is a list of words in the target language.

Further, the processing module 104 can be configured to apply a set of rules that allow transformations from G to G, G to X, X to X, X to S, and S to S. After application of the various rules of transformation, the final S that results is the sequence of words that represents the output sentence.

In a preferred embodiment, the rules are modeled as pattern-matching, and substitution rules. The rules typically have a pattern which is looked-for in the input, and if the pattern matches, a certain transformation is specified in the rule.

The processing module 104 can be configured to control the overall conversion mechanism. The processing module 104 can provide instructions to convert a large class of generic, semantically-oriented interlingua into any natural language. The processing module 104 can be configured to generate a graph representation from the connected graph in the semantic interlingua using at least one graph rule applied by a rule engine.

The connected graph representation disclosed herein can include a plurality of graph nodes indicating at least one of a word sense with annotations, a set of attributes, a special identifier indicating a sub-graph, a list of edges, or the like. The plurality of nodes includes an entry node representing an entry-point for parsing the sentence. Each graph node in the graph representation is associated with a dictionary, wherein the dictionary includes at least one of a root form of the word sense, morphological properties, parts of speech, semantic attributes, and framing structure, or the like. The set of attributes associated with each graph node in the graph representation defines a semantic transformation of the graph node. The set of attributes associated with each graph node is normalized based on one or more attribute rules applied by one or more rule engines of the rule engine 106.

The processing module 104 can be configured to generate a tree representation based on an analysis of the connected graph representation. In an embodiment, the graph representation is analyzed based on at least one graph to tree rule applied by the rule engine. The rule engine can be configured to define the one or more semantic rules using an edge pattern, a two node pattern, an output pattern, an output variable, or the like.

In an embodiment, the tree representation described herein can include a specific type of tree, referred to here as xtree structure, representing a syntactic structure. The xtree structure can include a Maximal Projection (MP) node, an Intermediate Projection (IP) node, a Head (H) node, or the like. Each tree node can be associated with a label representing a word position in the tree representation, a pointer to define the tree representation, a link to the tree representation to which the tree node belongs, morphological properties of a word, or the like.

The processing module 104 can be configured to transform the tree representation into the sentence in the at least one target language, where the tree representation is transformed based on at least one sequence transformation rule applied by the rule engine. The processing module 104 may apply a sequence of transformations based on rules in generating the sentence in the at least one target language, including but not limited to movement rules to transform the tree structure based on patterns in the tree structure, morphology rules to transform the tree with leaves of word-nodes associated with attributes into a linear structure of actual words, and sequence transformation rules to operate on the words in the linear structure, to generate a sequence of words that can be used to form a sentence.

In a preferred embodiment, the processing module 104 is further configured to perform sentence extraction to generate the final sentence in a user readable format based on the sequence of words generated.

The user interface module 110 can be configured to communicate the final user readable sentence in the target language to a receiving party or user. The mode of output enabled by the user interface module 110 to the user of the electronic device 100 can be, but is not limited to, at least one of an audio, a visual, and an audio visual.

The at least one target language can be configured based on user selection. In other embodiments, the at least one target language can be pre-configured to a specific language.

Further, the network module 112 can be configured to allow communication between various modules within the electronic device 100. The network module 112 can be configured to implement necessary interfaces to enable communication and data transfer with external devices including interfaces for but not limited to Wide Area Network (WAN), Local Area Network (LAN), cellular network, satellite network (for example, to enable GPS communication), WiFi, WiMAX, Bluetooth, USB, and Ethernet.

The storage module 118 can be configured to store data and instructions to perform various operations as described herein, including rules for various rule engines.

In an embodiment, the storage module 118 can include a database, where the database is an internal database tightly coupled to the application components. In other embodiments, the database can be an independent service running on a same computing machine, or a different machine being accessible over a network using the interfaces provided by the network module 112. The database may be a relational SQL database, Operational Database, text database or No-SQL database and/or combination thereof. In some embodiments database may be a single instance running on a single machine. In some other embodiments, the storage module 118 may host a single instance from a cluster of databases running in multiple locations, each updating each other using a master-slave configuration or otherwise.

In an embodiment, the storage module 118 may use the file system of the electronic device 100 to provide storage functionality to the various modules.

Although the FIG. 1 shows a limited overview of various modules of the electronic device 100 incorporating the conversion system but, it is to be understood that other embodiments are not limited thereon. The various modules are only one example of a suitable environment and are not intended to suggest any limitation as to the scope of use or functionality of the invention. Further, the conversion system can include different modules communicating among each other locally or remotely along with a combination of hardware and software components. For example, a component can be, but not limited to, a process running in the master or slave device, an executable process, a thread of execution, a program, or a computer.

Figure 2:
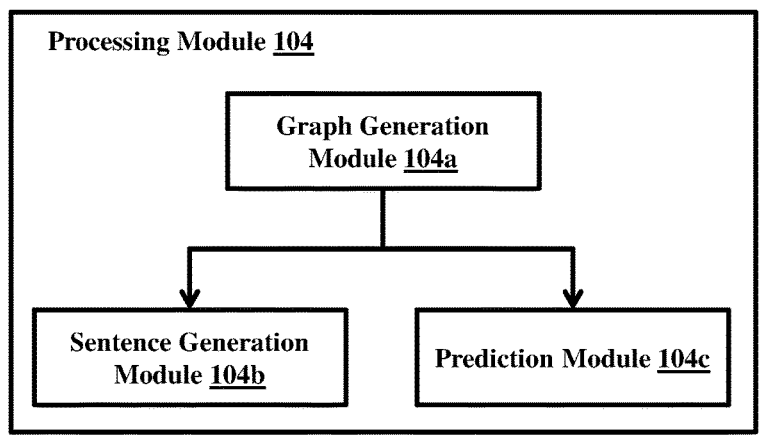
FIG. 2 is a block diagram illustrating various modules of a processing module, according to an embodiment of the present invention as disclosed herein.

FIG. 2 is a block diagram illustrating various modules of the processing module 104, according to an embodiment of the present invention as disclosed herein. In an embodiment, the processing module 104 includes a graph generation module 104a, a sentence generation module 104b, and a prediction module 104c.

The graph generation module 104a can be configured to construct the at least one connected graph in the semantic interlingua, where the at least one connected graph is made of the words and the relationships with the selected at least one picture word. Further, the graph generation module 104a can be configured to determine the list of attributes relevant to the word based on the at least one selected picture word, and present the list of attributes to the user on the screen of the electronic device 100. Further, the graph generation module 104a can be configured to receive the at least one attribute selected by the user from the list of attributes. Further, the graph generation module 104a can be configured to add the at least one selected attribute to the word, and update the at least one connected graph with the at least one selected attributes.

The sentence generation module 104b can be configured to generate the graph representation from the connected graph in the semantic interlingua using the at least one graph rule applied by the rule engine. The graph representation includes the plurality of graph nodes indicating at least one of the word sense with annotations, the set of attributes, the special identifier indicating the sub-graph, the list of edges, or the like. Each graph node is associated with the dictionary, where the dictionary includes at least one of the root form of the word sense, the morphological properties, the parts of speech, the semantic attributes, and the framing structure. The plurality of graph nodes includes the entry node representing the entry-point for parsing the sentence.

In an embodiment, the sentence generation module 104b can be configured to generate the graph representation from the connected graph in the semantic interlingua using the at least one graph rule applied by the rule engine by enumerating all sub-graphs, creating an empty graph for each of the sub-graph, converting each node of an edge into a unique node when either endpoints are pronouns, where each of the edge includes at least two nodes, creating a map for mapping node identifiers to each of the node, setting an entry point for each sub-graph, and adding the edge as a relation to the at least two nodes. In an embodiment, at least one of the word sense, the annotations, the set of attributes, the special identifier indicating sub-graph, and the list of edges associated with each of the graph node in the graph representation defines a transformation of the graph node, where the graph node or the graph structure is modified based on at least one graph rule. In an embodiment, the graph rule includes of the pattern that specifies that the attribute is one of, exactly one of, or the maximum of one of the given list of attributes. In another embodiment, the graph rule includes the graph pattern, the constraints on the pattern, and the output operation.

Further, the sentence generation module 104b can be configured to generate the tree representation based on the analysis of the graph representation, where the graph representation is analyzed based on the at least one tree rule applied by the rule engine. Further, the sentence generation module 104b can be configured to transform the tree representation into the sentence in the at least one target language, where the tree representation is transformed based on the at least one sequence transformation rule applied by the rule engine. Further, the sentence generation module 104b can be configured to determine the list of attributes relevant to the sentence, and present the list of attributes to the user on the screen of the electronic device 100. Further, the sentence generation module 104b can be configured to receive the at least one attribute selected by the user from the list of attributes, and add the at least one selected attribute to the sentence. Further, the sentence generation module 104b can be configured to update the at least one connected graph with the at least one selected attribute.

In an embodiment, the sentence generation module 104b can be configured to modify the graph representation based on the analysis of the graph representation by traversing the graph representation node-by-node, where the graph representation is traversed from the entry node and proceeding outwards along edges. Further edges are selected in the graph representation from among those which create a cycle in the graph, or which cause an entry node to have at least one input edge, cause a node that is not an entry node to have two or more input edges, and cause a node to have more than one input edges of give type; and forming the selected edges, breaking edges having a start node, and end node, and a relation.

The breaking edges includes removing the relation from the graph representation, duplicating the end node of the edge, marking the duplicate node with a pronoun attribute, connecting the duplicate node to the start node, where the edge is broken into the start node and the duplicate, and the end-node along with rest of the graph representation, and determining whether resulting graph representation is one of connected and broken into two fragments by the edge-breaking. The sentence generation module 104b can be configured to infer a pronoun when the resulting graph is determined as connected. Further, the sentence generation module 104b can be configured to infer a relative clause when the resulting graph is determined as fragment.

The tree representation includes an xtree structure representing a syntactic structure, where the xtree structure includes a maximal projection node, at least one of an intermediate projection node, and a head node, pointers, and properties for the tree representation. The tree representation includes a trace to another part, where the trace to another part is represented by having a maximal projection node. The operations performed on the tree representation includes at least one of initializing with a pattern, substitution of a tree, adjunction of a tree, detachment and movement of a sub-tree from one location to another using at least one movement rule, leaf traversal and application of a function with accumulation of result.

In an embodiment, the at least one graph to tree rule is defined using at least one of an edge pattern in the graph representation, two node patterns in the graph representation, an output pattern in the tree representation, and an output variable in the tree representation. The at least one tree rule is applied by traversing the graph representation in an order of edge types, and checking each edge against a list of patterns of all possible graph-to-tree rules.

In an embodiment, a tree rule check is performed between corresponding entry nodes of the sub-graph, when a sub-graph is encountered. The tree rules pairwise coalesce separate trees and graphs in the graph representation to create the cumulative tree representation that comprise all the sub-trees in various substitution and adjunction positions. The sentence is defined as a top-most tree represented as xtree whose maximal projection node is of type Complementarizer. The Complementarizer xtree is followed by a sequence of xtrees whose maximal projection are of type Inflection which end in an xtree whose maximal projection is of type Verb, wherein head node of the Verb xtree is a main verb of the sentence.

Further, the Complementarizer xtree is created for a full sentence by searching for a pattern in the tree representation, where the pattern is in given chain within the tree representation, which matches given constraints on the pattern, performing a tree transformation operation on the sentence, and appending a terminal punctuation to the sentence.

In an embodiment, performing the tree transformation pattern operation on the sentence includes at least one of performing no operation, moving a node from one location to another location of the sub-tree, and creating the Complementarizer xtree with given template. The at least one movement rule includes pattern to find source of movement, pattern to find destination of movement, and operation to be performed if both source and destination patterns are found.

In an embodiment, the operation to be performed if both source and destination patterns are found is one of movement of sub-tree to a given vacant node, movement of head to a given head node, copying properties from one tree structure to another, setting properties on given tree structure, removal of sub-tree, and changing the word of a sub-tree.

In an embodiment, the sentence generation module 104b can be configured to transform the tree representation into the sentence of the target language includes generating a sequence of words representing the sentence based on the tree representation, where the sequence of words is generated by in-order traversal of the leaves of the tree representation, and converting the sequence of words into a sentence of the target language using the at least one sequence transformation rule, where the sequence transformation rule operates on a list of words excluding punctuation marks. The sequence transformation rule includes pattern to search, and at least one output operation, where the pattern to search consists of a regular expression matching at least one element of the sequence, and where output operation is at least one of substitution of a word or set of words in the sequence by another word, deletion of a word or set of words in the sequence, addition of at least one word to the sequence, and rearrangement of words in the sequence, when the natural language is English.

The prediction module 104c can be configured to predict the relations, words, and attributes based on the sentence, where the prediction includes determining feasible attributes to a selected word from the sentence, determining feasible relations to the selected word, and determining feasible words for the at least one relation from the feasible relations, where the predicted relations, words, and attributes are presented to the user for further selection to construct the sentence. In an embodiment, the at least one of probabilities and statistics from the sentence to incorporate into the database module 114 for further use by the prediction module 104c. Further, the functionalities of the prediction module 104c are explained in conjunction with FIG. 3.

Although the FIG. 2 shows a limited overview of various modules of the processing module 104 incorporating the conversion system but, it is to be understood that other embodiments are not limited thereon. The various modules are only one example of a suitable environment and are not intended to suggest any limitation as to the scope of use or functionality of the invention. Further, the conversion system can include different modules communicating among each other locally or remotely along with a combination of hardware and software components. For example, a component can be, but not limited to, a process running in the master or slave device, an executable process, a thread of execution, a program, or a computer.

Figure 3:
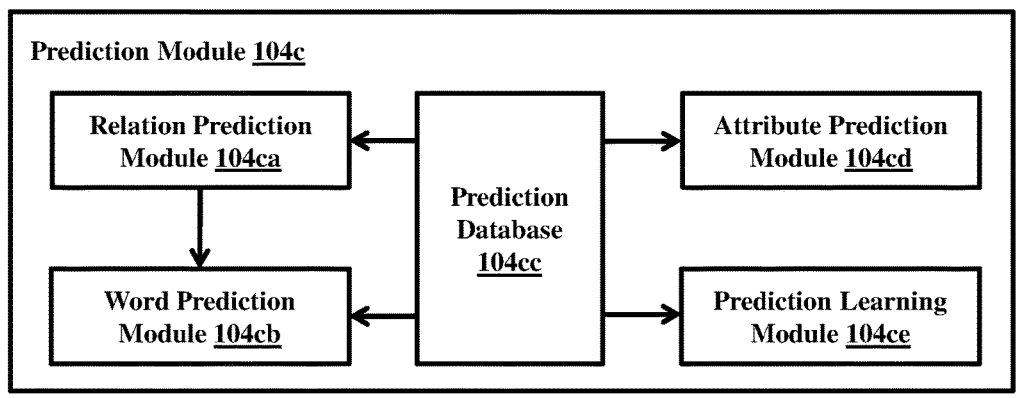
FIG. 3 is a block diagram illustrating various modules of a prediction module, according to an embodiment of the present invention as disclosed herein.

FIG. 3 is a block diagram illustrating various modules of the prediction module 104c, according to an embodiment of the present invention as disclosed herein. In an embodiment, the prediction module 104c includes a relation prediction module 104ca, a word prediction module 104cb, a prediction database 104cc, an attribute prediction module 104cd, and a prediction leaning module 104ce.

After receiving the current graph as input by the prediction module 104c to predict new relations, words, and attributes, the attribute prediction module 104cd can be configured to calculate the feasible attributes to the selected word by the user. The relation predictor module 104*ca* can be configured to calculate the feasible relations to the selected word. For each feasible relation, the word prediction module 104*cb* can be configured to calculate the feasible words that can be attached to the graph with the feasible relation. The prediction learning module 104*ce* can be configured to learn new probabilities or statistics from the sentence to incorporate into the prediction database 104*cc*.

Although the FIG. 3 shows a limited overview of various modules of the prediction module 104*c* incorporating the conversion system but, it is to be understood that other embodiments are not limited thereon. The various modules are only one example of a suitable environment and are not intended to suggest any limitation as to the scope of use or functionality of the invention. Further, the conversion system can include different modules communicating among each other locally or remotely along with a combination of hardware and software components. For example, a component can be, but not limited to, a process running in the master or slave device, an executable process, a thread of execution, a program, or a computer.

Figure 4:
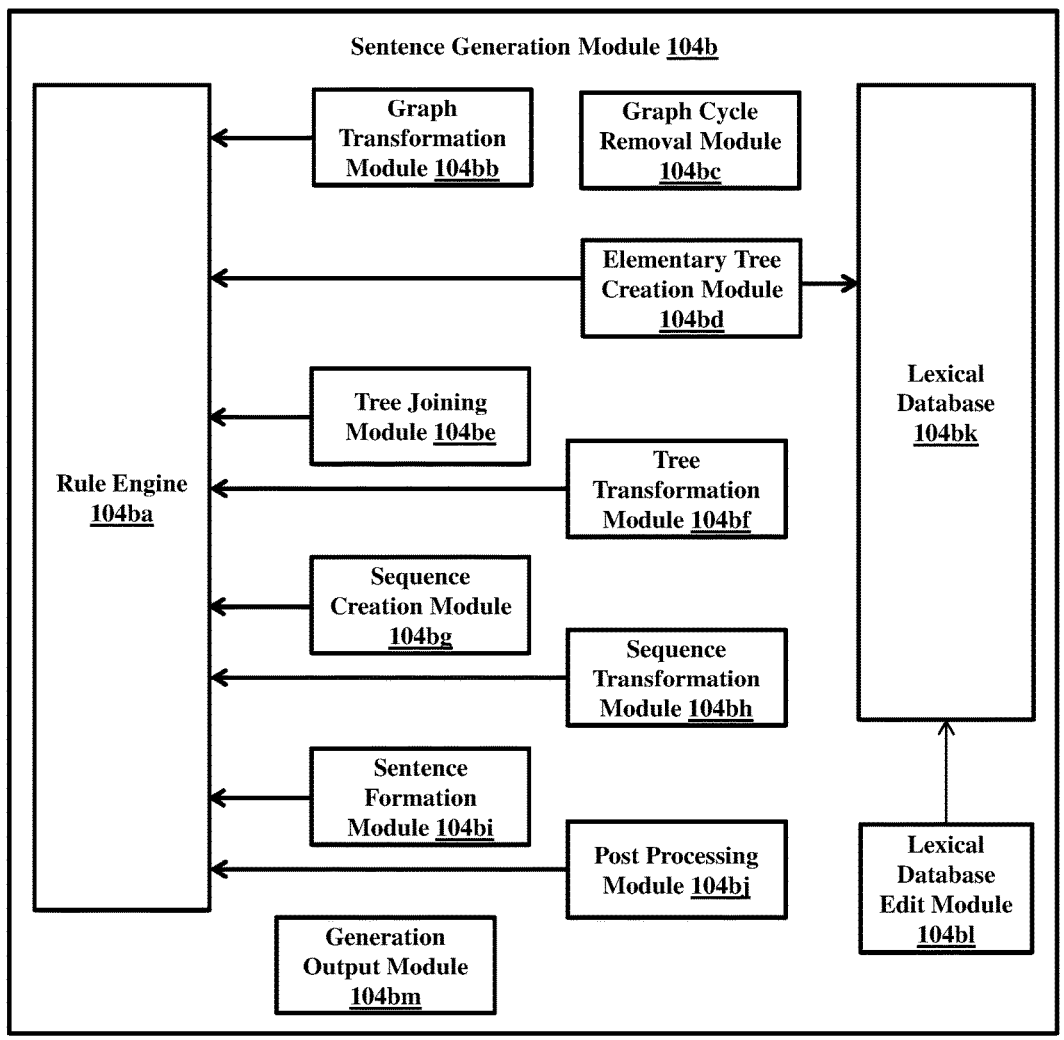
FIG. 4 is a block diagram illustrating various modules of a sentence generation module, according to an embodiment of the present invention as disclosed herein.

FIG. 4 is a block diagram illustrating various modules of the sentence generation module 104, according to an embodiment of the present invention as disclosed herein. In an embodiment, the sentence generation module 104 includes the rule engine 104*ba*, a graph transformation module 104*bb*, a graph cycle removal module 104*bc*, an elementary tree creation module 104*bd*, a tree joining module 104*be*, a tree transformation module 104*bf*, a sequence creation module 104*bg*, a sequence transformation module 104*bh*, a sentence formation module 104*bi*, a post processing module 104*bj*, a lexical database 104*bk*, a lexical database edit module 104*bl*, and a generation output module 104*bm*.

The graph transformation module 104*bb* can be configured to apply graph rules by the rule engine 104*ba* to transform the graph from one form to another form. The graph cycle removal module 104*bc* can be configured to remove cycles from the graph to make it acyclic. The elementary tree creation module 104*bd* can be configured to create an elementary tree for every node in the graph based on the attributes and the base word. The tree joining module 104*be* can be configured to join the elementary trees into a single tree. The tree transformation module 104*bf* applies movement rules to transform the tree from one form to another form. The sequence creation module 104*bg* can be configured to initialize sequence to empty sequence. Further, the sequence creation module 104*bg* can be configured to select first leaf in in-order traversal of tree and add to the sequence.

The sequence transformation module 104*bh* can be configured to read sequence transformation patterns and corresponding operations from the database module 114. Further, the sequence transformation module 104*bh* can be configured to transform the tree into a sequence through in-order traversal of the tree and apply sequence transformation rules to transform the sequence. The sequence transformation module 104*bh* applies post-processing rules on the sequence of words. The sentence formation module 104*bi* can be configured to pick a morphological form of a word for each item in the sequence to get a word sequence. The post processing module 104*bj* can be configured to apply corresponding operation to transform the sentence from one form to another form.

The user of the electronic device 100 adds new words to the lexical database 104*bk* through the user interface module 110. The existing words to the lexical database 104*bk* can be edited using the lexical database edit module 104*bl*. The generation output module 104*bm* return the word sequence (i.e., the output sentence) back to the calling modules.

Although the FIG. 4 shows a limited overview of various modules of the sentence generation module 104 incorporating the conversion system but, it is to be understood that other embodiments are not limited thereon. The various modules are only one example of a suitable environment and are not intended to suggest any limitation as to the scope of use or functionality of the invention. Further, the conversion system can include different modules communicating among each other locally or remotely along with a combination of hardware and software components. For example, a component can be, but not limited to, a process running in the master or slave device, an executable process, a thread of execution, a program, or a computer.

Figure 5A:
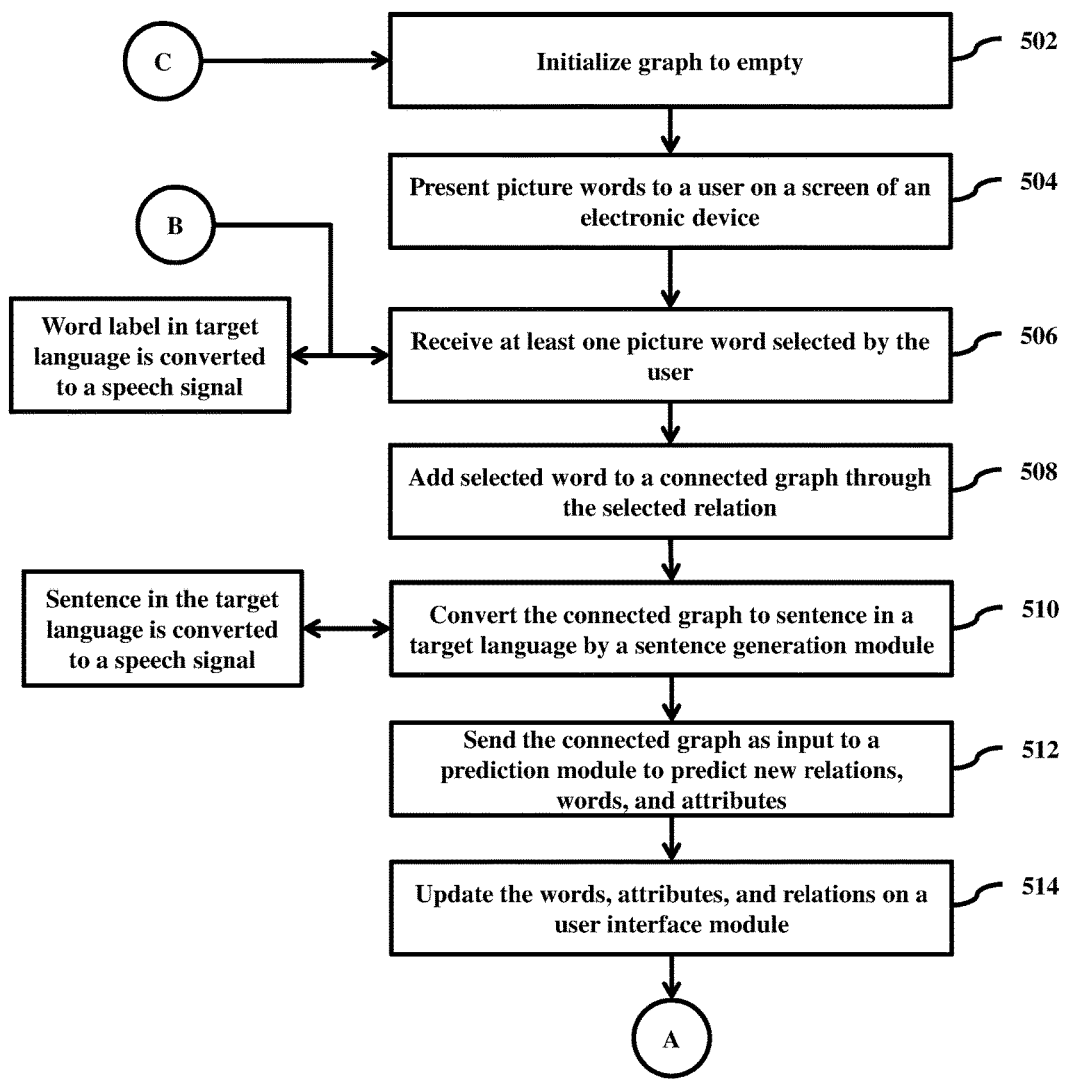
FIG. 5A to 5B is a flow chart illustrating a method for generating the sentence in the at least one target language and sending the generated sentence to the speaker module and prediction learning module, according to an embodiment of the present invention as disclosed herein.
Figure 5B:
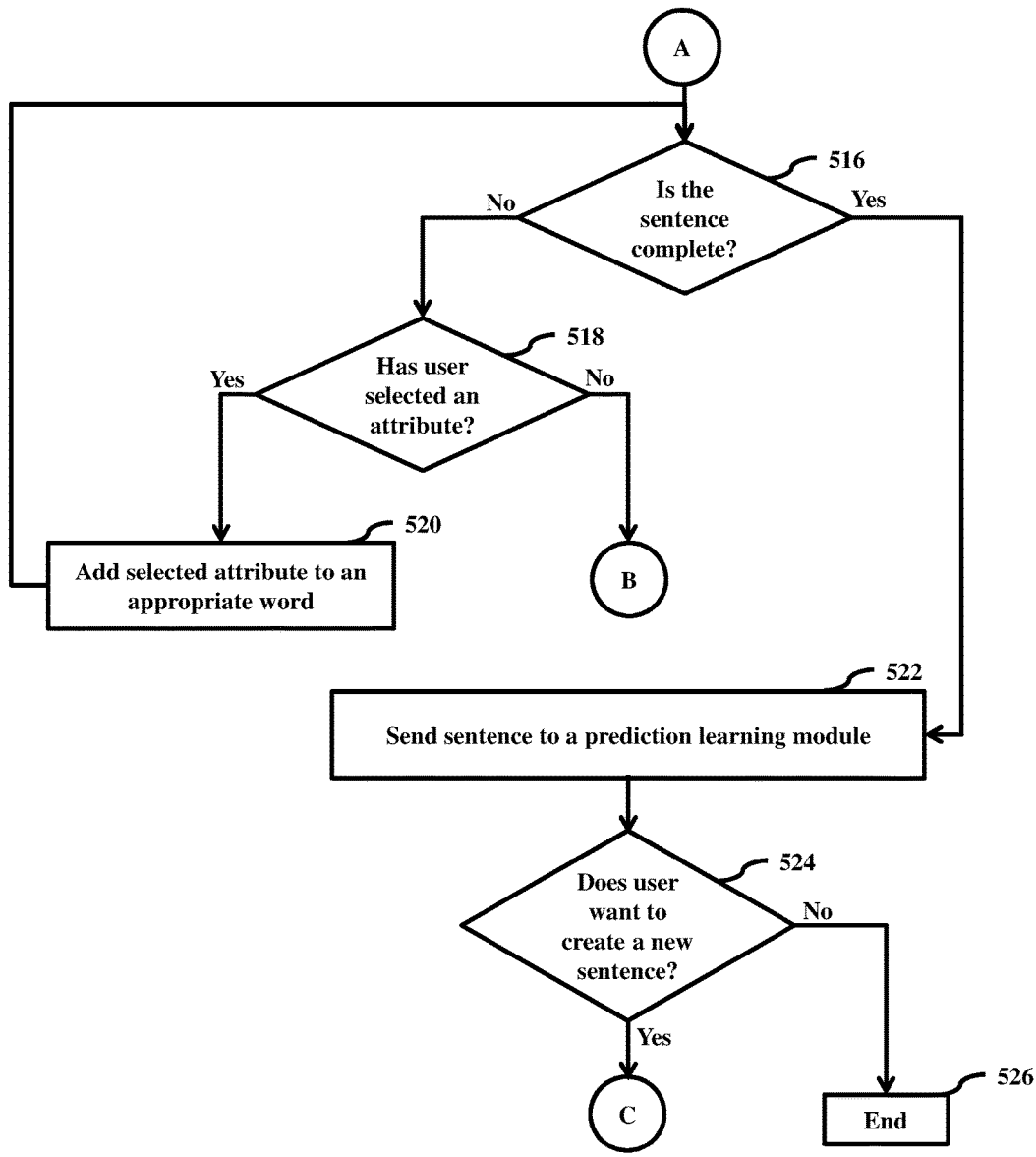

FIG. 5 is a flow chart 500 illustrating a method for generating the sentence in the at least one target language and sending the generated sentence to the prediction learning module 104*ce*, according to an embodiment of the present invention as disclosed herein. At step 502, the method includes initializing the graph to empty. At step 504, the method includes presenting the picture words to the user on the screen of the electronic device 100. The method allows the user interface module 110 to present the picture words to the user on the screen of the electronic device 100.

At step 506, the method includes receiving the at least one picture word selected by the user. The method allows the user interface module 110 to receive the at least one picture word selected by the user. Here, the word label in the target language is converted to the speech signal. At step 508, the method includes adding the selected word to the connected graph (or current graph). The method allows the graph generation module 104*a* to add the selected word to the connected graph. At step 510, the method includes converting the connected graph to the sentence in the target language. The method allows the sentence prediction module 104*b* to convert the connected graph to the sentence in the target language.

At step 512, the method includes sending the connected graph as input to the prediction module 104*c* to predict new relations, words, and attributes. The method allows the network communication module 112 to send the connected graph as the input to the
  prediction module 104*c* to predict new relations, words, and attributes. At step 514, the method includes updating the words, attributes, and relations on the user interface module 110. If it is determined, at step 516, that the sentence is not complete then, at step 518, the method includes determining whether the user selected the attribute. If it is determined, at step 518, that the user not selected the attribute then, the method is looped back to step 506. If it is determined, at step 518, that the user selected the attribute then, at step 520, the method includes adding selected attribute to an appropriate word.

If it is determined, at step 516, that the sentence is complete then, at step 522, the method includes sending the sentence to the prediction learning module 104*ce*. If it is determined, at step 524, that the user wants to create a new sentence then, the method is looped back to step 502. If it is determined, at step 524, that the user does not want to create a new sentence then, at step 526, the method is ended.

The various actions, acts, blocks, steps, and the like in the flow chart 500 may be performed in the order presented, in a different order or simultaneously. Further, in some embodiments, some actions, acts, blocks, steps, and the like may be omitted, added, modified, skipped, and the like without departing from the scope of the invention.

Figure 6:
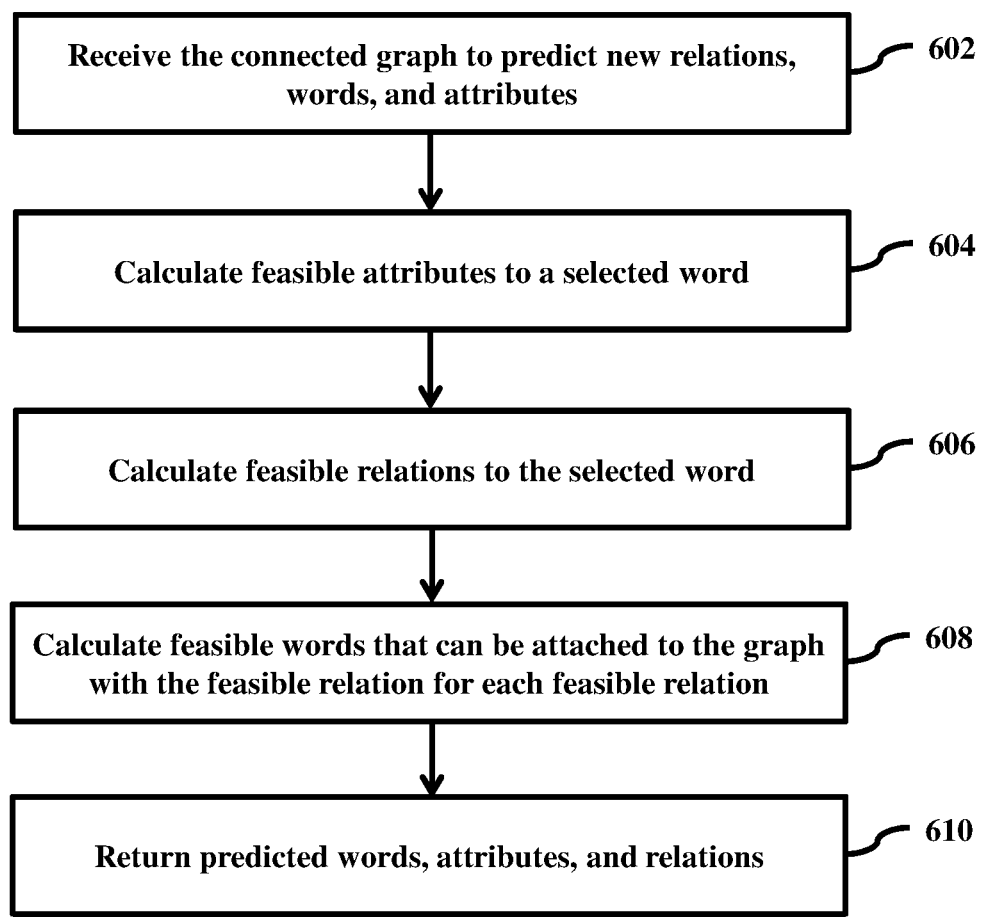
FIG. 6 is a flow chart illustrating a method for prediction as implemented in the prediction module, according to an embodiment of the present invention as disclosed herein.
Figure 7A:
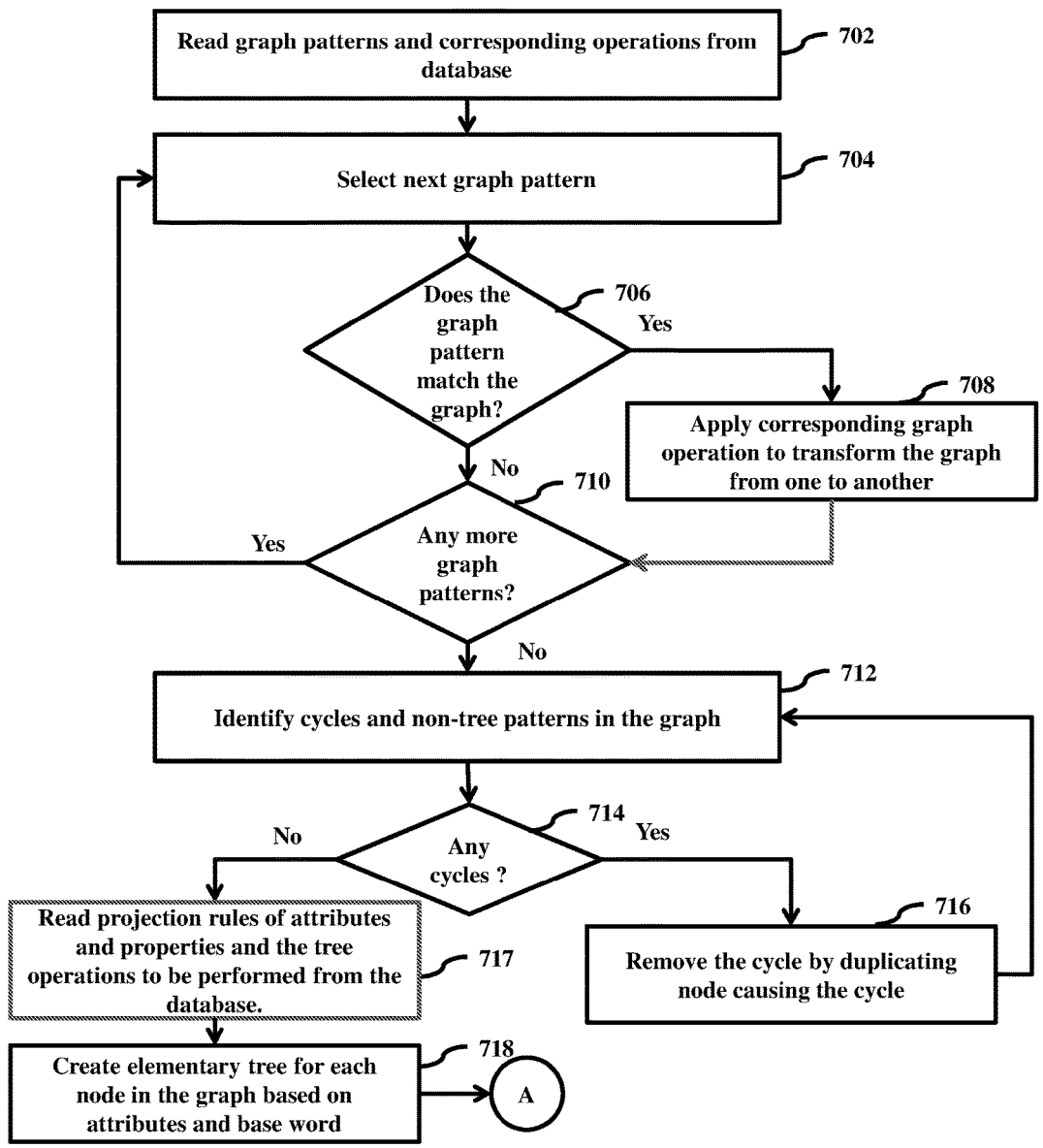
Figure 7B:
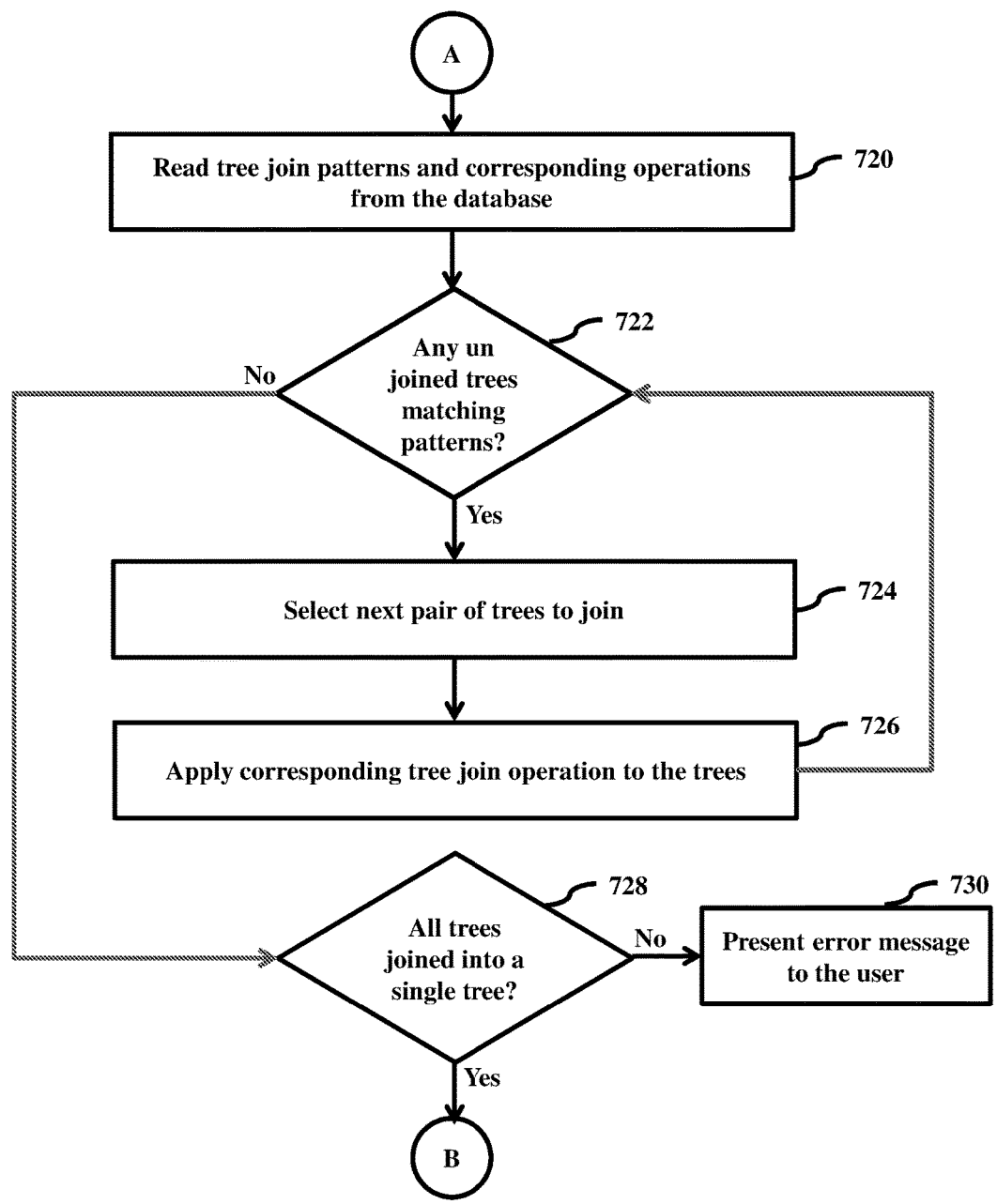
Figure 7D:
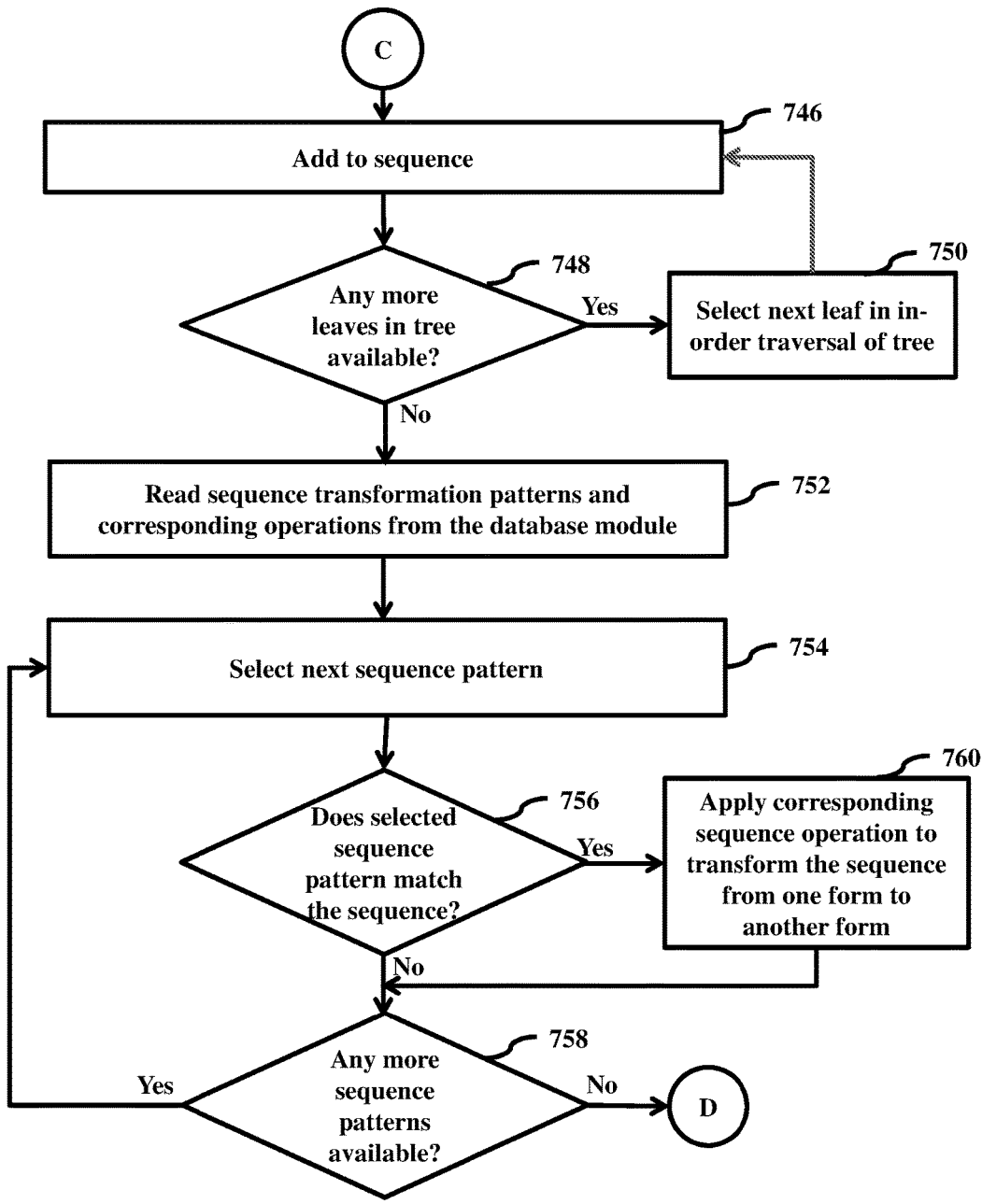
Figure 7F:
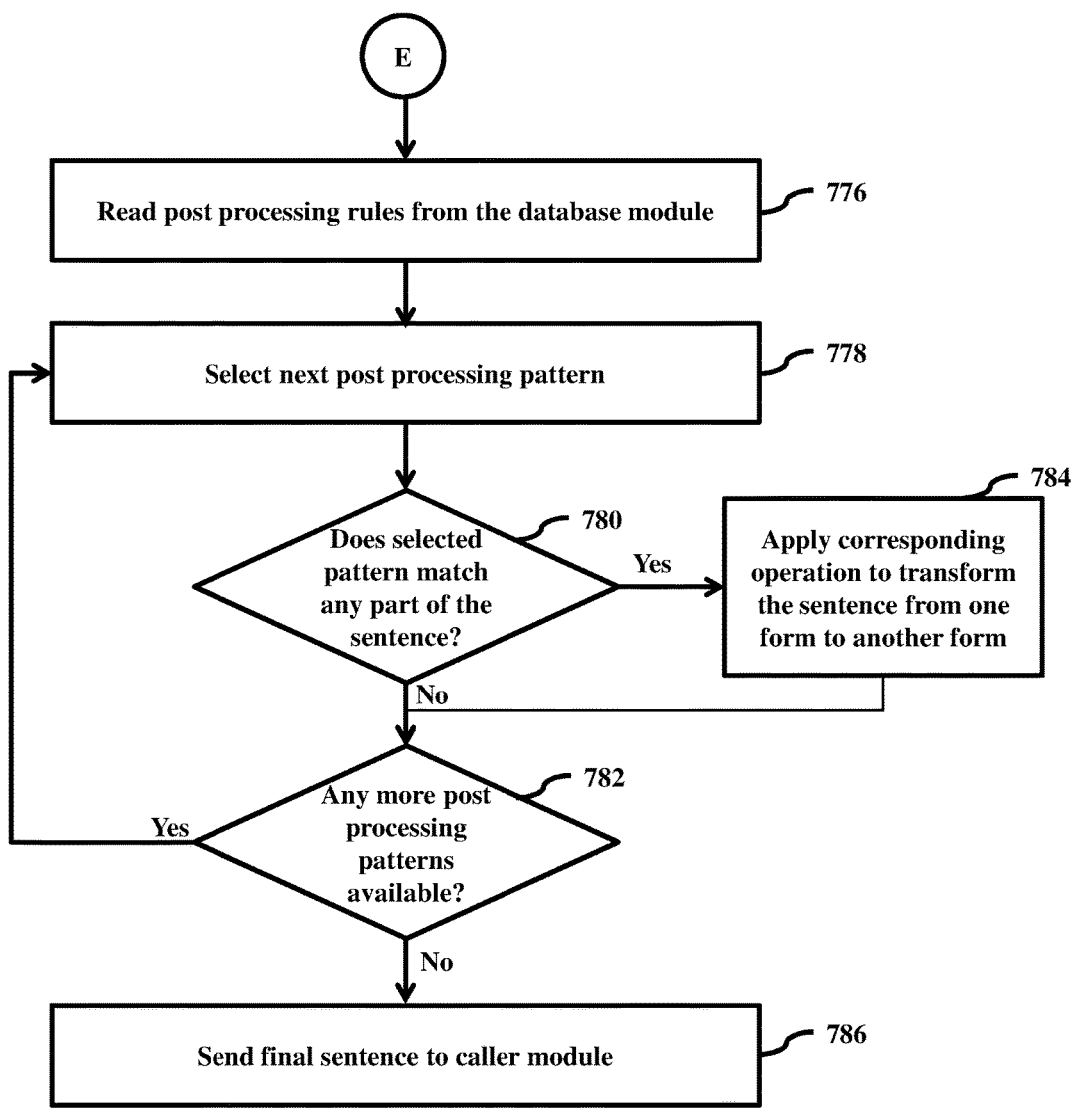
Figure 8:
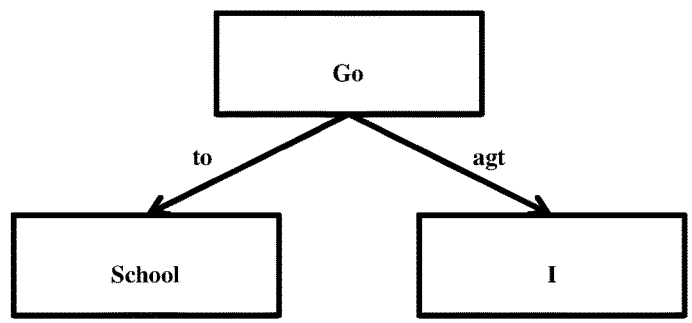
FIG. 8 illustrates an example semantic graph (without sub-graphs), according to an embodiment of the present invention as disclosed herein.
Figure 9:
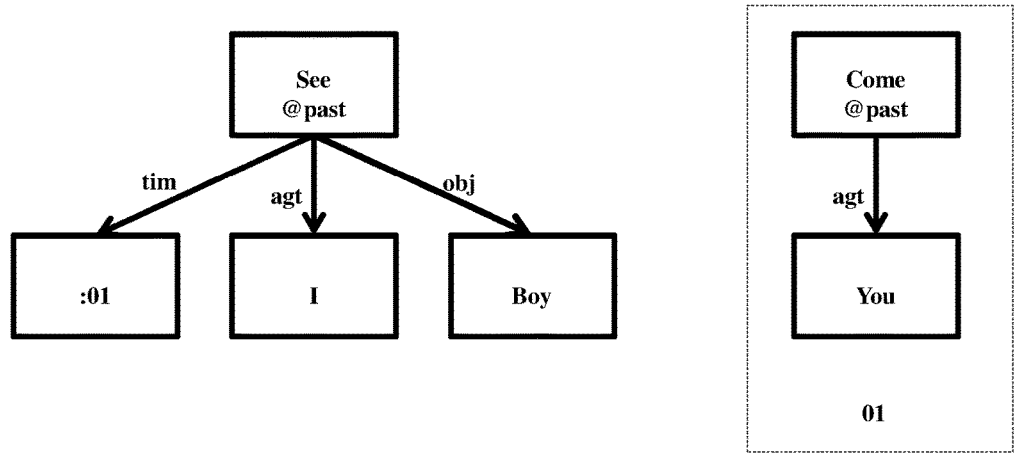
FIG. 9 illustrates an example semantic hypergraph (with sub-graphs), according to an embodiment of the present invention as disclosed herein.

FIG. 6 is a flow chart 600 illustrating a method implemented in the prediction module 104c, according to an embodiment of the present invention as disclosed herein. At step 602, the method includes receiving the connected graph to predict the new relations, words, and attributes. The method allows the attribute prediction module 104cd to receive the connected graph to predict the new relations, words, and attributes.

At step 604, the method includes calculating the feasible attributes to the selected word. The method allows the attribute prediction module 104cd to calculate the feasible attributes to the selected word. At step 606, the method includes calculating the feasible relations to the selected word. The method allows the relation prediction module 104ca to calculate the feasible relations to the selected word.

At step 608, the method includes calculating the feasible words that can be attached to the graph with the feasible relation for each feasible relation. The method allows the word prediction module 104cb to calculate the feasible words that can be attached to the graph with the feasible relation for each feasible relation. At step 610, the method includes returning the predicted words, attributes, and relations.

The various actions, acts, blocks, steps, and the like in the flow chart 600 may be performed in the order presented, in a different order or simultaneously. Further, in some embodiments, some actions, acts, blocks, steps, and the like may be omitted, added, modified, skipped, and the like without departing from the scope of the invention.

FIGS. 7A to 7F show a flow chart 700 illustrating a method implemented in the sentence generation module 104bb, according to an embodiment of the present invention as disclosed herein. At step 702, the method includes reading the graph patterns and corresponding operations from the database module 114. At step 704, the method includes selecting next graph pattern. The method allows the graph transformation module 104bbb to select the next graph pattern. If it is determined, at step 706, that the graph pattern matches the graph then, at step 708, the method includes applying the corresponding graph operation to transform the graph from one form to another form. The method allows the graph transformation module 104bb to apply the corresponding graph operation to transform the graph from one form to another form.

If it is determined, at step 706, that the graph pattern does not match the graph or after step 708, the method includes, at step 710, determining whether any more graph pattern are available. If it is determined, at step 710, that more graph patterns are available then, the method is looped back to step 704. If it is determined, at step 710, that more graph patterns are not available then, at step 712, the method includes identifying the cycles and the non-tree patterns in the graph. The method allows the graph cycle removal module 104bc to identify the cycles and the non-tree patterns in the graph.

If it is determined, at step 714, that any cycles available then, at step 716, the method includes removing the cycle by duplicating node causing the cycle. The method allows the graph cycle removal module 104bc to remove the cycle by duplicating node causing the cycle. If it is determined, at step 714, that any cycles are not available then, at step 717, the method includes reading the elementary tree projection rules containing tree operations on the elementary tree projected based on the attributes on the word from the database. Further, at step 718, the method includes creating the elementary tree for each node in the graph based on attributes and base word. These elementary trees are referred to as separate tree representations. The method allows the elementary tree creation module 104bd to create the elementary tree for each node in the graph based on attributes and base word. At step 720, the method includes reading tree join patterns and corresponding operations from the database module 114. The method allows tree joining module 104be to read the tree join pattern and corresponding operations from the database module 114.

If it is determined, at step 722, that the any unjoined separate trees matching the tree patterns then, at step 724, the method include selecting the next pair of separate trees to join. The method allows the tree joining module 104be to select the next pair of trees to join. At step 726, the method includes applying corresponding tree join operation to the trees. The method allows the tree joining module 104be apply corresponding tree join operation to the trees. After this, the control again moves back to step 722 to determine if there are any more unjoined trees that match any other patterns. After exhausting all matching patterns, if it is determined, at step 722, that any unjoined trees are not matching the tree patterns then, the method loops to step 728. If it is determined, at step 728, that all trees are not joined into a single tree then, at step 730, the method includes displaying (presenting) an error message to the user. If it is determined, at step 728, that all trees are joined into the single cumulative tree then, at step 732, the method includes reading the tree transformation patterns and corresponding operations from the database module 114. At step 734, the method includes selecting the next tree transformation pattern. The method allows the tree transformation module 104be to select the next tree pattern.

If it is determined, at step 736, that the selected tree pattern does not matches the tree then, at step 738, the method includes determining whether any more patterns are available. The method allows the tree transformation module 104be to determine whether any more patterns are available. If it is determined, at step 736, that the selected tree pattern matches the tree then, at step 740, the method includes applying corresponding tree operation to transform the tree form one form to another form and looped to step 734 to determine more transformations to match. The method allows the tree transformation module 104be to apply corresponding tree operation to transform the tree form one form to another form and looped to step 738.

If it is determined, at step 738, that any more patterns are available then, the method is looped back to step 734. If it is determined, at step 738, that any more patterns are not available then, at step 742, the method includes initializing sequence to empty sequence. The method allows the sequence creation module 104bg to initialize the sequence to the empty sequence. At step 744, the method includes selecting first leaf in in-order traversal of the tree. The method allows the sequence creation module 104bg to select the first leaf in in-order traversal of the tree. At step 746, the method includes adding to the sequence. The method allows the sequence creation module 104bg to add to the sequence.

If it is determined, at step 748, that any more leaves in the tree then, at step 750, the method includes selecting next leaf in in-order traversal of the tree. The method allows the sequence creation module 104bg to select the next leaf in in-order traversal of the tree and then looped back to step 746 to add the leaf to the sequence. If it is determined, at step 748, that there aren't any more leaves in the tree then, at step 752, the method includes reading the sequence transformation patterns and corresponding operations from the database module 114. The method allows the sequence transformation module 104*bh* to read the sequence transformation patterns and corresponding operations from the database module 114. At step 754, the method includes selecting next sequence pattern. The method allows the sequence transformation module 104*bh* to select the next sequence pattern.

If it is determined, at step 756, that the selected sequence pattern does not matches the sequence then, at step 758, the method includes determining whether any more sequence patterns are available. The method allows the sequence transformation module 104*bh* to determine whether any more sequence patterns are available. If it is determined, at step 756, that the selected sequence pattern matches the sequence then, at step 760, the method includes applying corresponding sequence operation to transform the sequence from one form to another form and loops back to step 758. If it is determined, at step 758, that any more sequence patterns are available then, the method is looped back to step 754. If it is determined, at step 758, that any more sequence patterns are not available then, at step 762, the method includes reading the morphological rule from the database module 114. The method allows the sentence formation module 104*bi* to read the morphological rule from the database module 114. At step 764, the method includes selecting next element in the sequence. The method allows the sentence formation module 104*bi* to select the next element in the sequence.

At step 766, the method includes traversing the morphological rule tree and finding a matching form for the sequence element. The method allows the sentence formation module 104*bi* to traverse the morphological rule tree and find the matching form for the sequence element. If it is determined, at step 768, that the matching form not found then, at step 770, the method includes presenting the error message to the user. The method allows the sentence formation module 104*bi* to present the error message to the user. If it is determined, at step 768, that the matching form found then, at step 772, the method includes adding form to the sentence. The method allows the sentence formation module 104*bi* to add form to the sentence.

If it is determined, at step 774, that any more elements in the sequence are available then, the method loops back step 764. If it is determined, at step 774, that any more elements in the sequence are not available then, at step 776, the method includes reading post-processing rules from the database module 114. The method allows the post processing module 104*bj* to read the post-processing rules from the database module 114. At step 778, the method includes selecting next post-processing pattern. The method allows the post processing module 104*bj* to select the next post-processing pattern. If it is determined, at step 780, that the selected pattern does not match any part of the sequence then, at step 782, the method includes determining whether any more post processing patterns are available. The method allows the post processing module 104*bj* to determine whether any more post processing patterns are available. If it is determined, at step 780, that the selected pattern match any part of the sequence then, at step 784, the method includes applying corresponding operation to transform the sentence from one form to another form and looped back to step 782.

If it is determined, at step 782, that any more post processing patterns are available then, the method is looped back to step 778. If it is determined, at step 782, that any more post processing patterns are not available then, at step 786, the method includes sending final sentence to a caller module. The method allows the generation output module 104*bm* to send final sentence to the caller module.

The various actions, acts, blocks, steps, and the like in the flow chart 700 may be performed in the order presented, in a different order or simultaneously. Further, in some embodiments, some actions, acts, blocks, steps, and the like may be omitted, added, modified, skipped, and the like without departing from the scope of the invention.

FIG. 8A illustrates an example semantic graph (without sub-graphs), according to an embodiment of the present invention as disclosed herein. Typically, all sentences, however complex, can be decomposed as a cascading set of answers to a set of questions. This generates a representation that looks like a tree or graph; however, it is not strictly a tree or graph, since the representation may contain back-references, sub-graphs, and inter-links. An example semantic graph without sub-graphs is shown in the FIG. 8A. The graph represents a sentence "I go to school". The relation 'agt' represents the question 'who'. The relation 'to' represents the question 'where to'.

FIG. 8B illustrates an example semantic graph (with sub-graphs), according to embodiments as disclosed herein. The graph represents a sentence "I saw the boy when you came". The relation 'tim' represents the question 'when'.

Figure 10A:
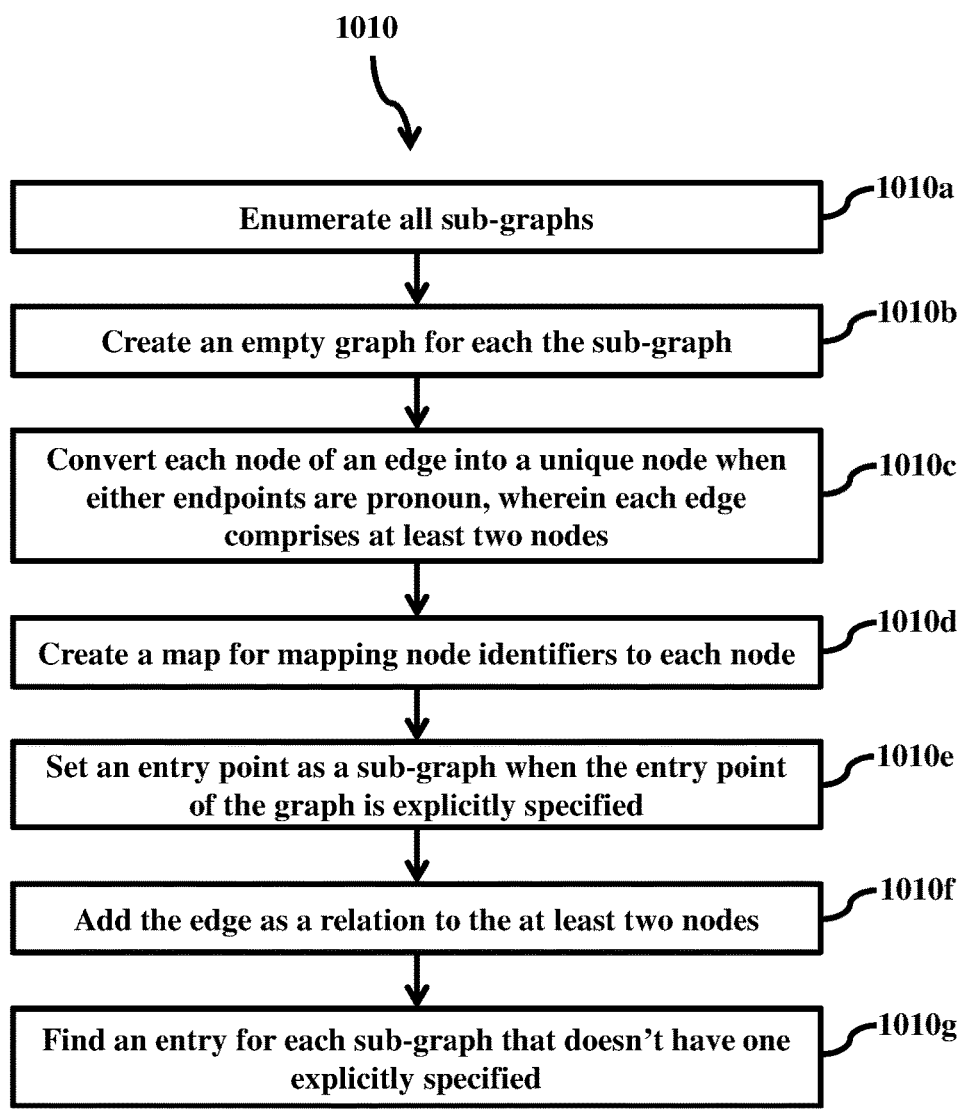
FIG. 10A is a flowchart illustrating a method for creating a graph representation out of the textual representation of the semantic interlingua, according to an embodiment of the present invention as disclosed herein.

FIG. 10A is a flowchart 1010 illustrating a method for creating the graph representation out of the textual representation, according to an embodiment of the present invention as described herein. The method includes:

At step 1010*a*, enumerating all sub-graphs;

At step 1010*b*, creating an empty graph for each the sub-graph;

At step 1010*c*, converting each node of an edge into a unique node when either endpoints are pronoun, wherein each edge comprises at least two nodes. For each edge, there are two nodes. At least, the following rules are applied with each of the nodes:

a. If either endpoint (node) is a pronoun, it is converted into a unique node (unless it is explicitly disambiguated). For example, if the sentence is "I have my book", the words "I" and "my" are both represented as 00.@1 but are separated as 00:1.@1 and 00:2.@1.
  b. At step 1010*d*, creating a map (dictionary representation) mapping node IDs to nodes.
     i. Split the node and its attributes.
     ii. For a sub-graph, set its Compound Graph to the appropriate sub-graph.
  c. At step 1010*e*, setting the entry node as such for that sub-graph, when the entry point of the graph is explicitly specified in the list of attributes of the node.
  d. At step 1010*f*, adding the edge as a relation to the two nodes (that is, add it as an in-node to the source and an out-node to the destination)

At step 1010*g*, finding an entry for each sub-graph that doesn't have one explicitly specified. Note that the graph should be connected for it to represent a well-formed sentence.

The methods herein also include applying rules to the graph representation. In a preferred embodiment, attributes are explicitly specified in the graph representation. However, in some embodiments, attributes are to be derived based on the graph representation. For instance, the infinitive form of a word is derived from a certain kind of graph relationship. If there is an object/content/purpose/reason relationship between two verbs, it is usually an indication of an infinitive, unless the second verb also has an agent relationship with something else. For example:

Eat is the object of want in the sentence "I want to eat."

Go is the content of tell in the sentence "I told him to go."

Eat is the purpose of come in the sentence "I came here to eat."

Teach is the reason of punish in the sentence "I punished him to teach him a lesson." However, in the following examples:

Go does not get the infinitive form in the sentence "I told him that I went." because it has an agent.

Reason of punish is steal in the sentence "I punished him because he stole." but it has an agent.

Also, depending on the kind of source verb, there are at least three ways in which infinitive may be expressed in English—either with the word "to", or with the gerund form of the destination verb, or without a marker. For example, the words "start", "want", etc. take the form "to". For example, I started to sing. I want to eat. But the words "start" and "stop" take the gerund form. For example, I started singing. I stopped singing. ("I stopped to sing" is wrong [if sing is the object of stop].) And words like "let" don't use either form. I let him go, not "I let him to go" or "I let him going".

Further, the methods herein also include resolving implicit pronouns and relative clauses. The graph created above should be a tree of graph nodes, with the following properties:

a) The entry node has no in-nodes;
b) No other node has more than one in-node; and
c) No cycle should be formed by any edge.

Breaking any of these properties may cause a non-tree to be formed, from which infer certain language properties, as described below.

Figure 10B:
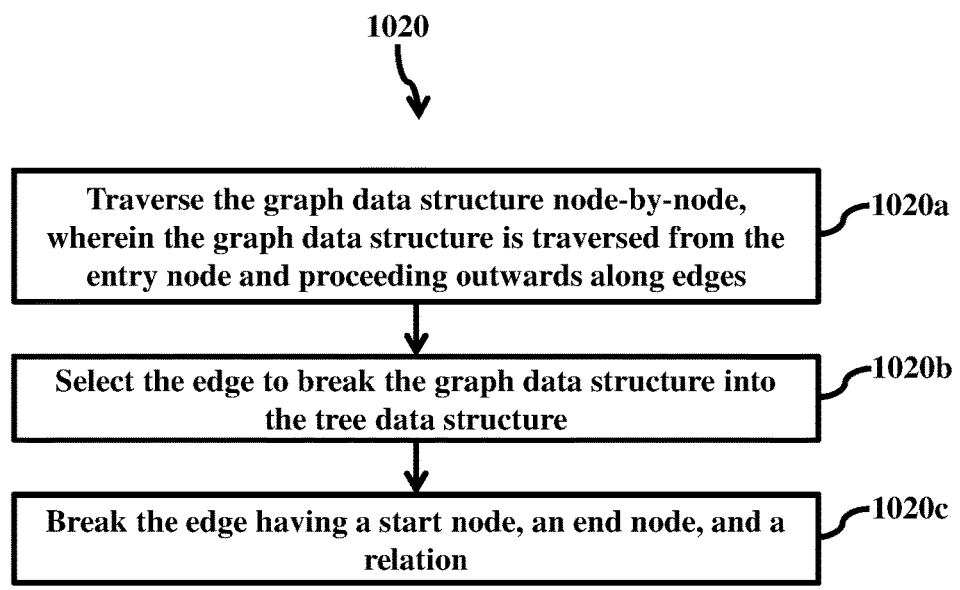
FIG. 10B is a flowchart illustrating a method for removing cycles from the graph representation by resolving pronouns and relative clauses, according to an embodiment of the present invention as disclosed herein.

FIG. 10B is a flowchart 1020 illustrating a method for converting the graph representation to the tree representation, according to an embodiment of the present invention as disclosed herein. The method includes:

At step 1020*a*, traversing the graph representation node-by-node, wherein the graph representation is traversed from an entry node and proceeding outwards along edges. In an embodiment, the graph is traversed node-by-node, starting from the entry node and proceeding outwards along edges.

At step 1020*b*, selecting the edge to break the graph representation into the tree representation. If a sub-graph is encountered, that sub-graph is converted into a tree as a preliminary step. In each node, at least the following are checked:

a. If it is the entry node, it should have no incoming edge. Otherwise, the first edge is selected for breaking.
b. If it is not the entry node, it should have at most one incoming edge. Otherwise, the second in edge is selected for breaking. Unless one of the conditions is satisfied:
  i. The second in-edge comes from the entry node, in which case the first in-edge is selected for breaking. (Otherwise, the entry node gets duplicated.) as illustrated in FIG. 10H.
  ii. The second edge is an agent in-edge. In this case, the first in-edge is selected for breaking. (Otherwise, the pronoun gets applied to the wrong word—especially reflective pronouns.) as illustrated in FIG. 10I.
c. In an embodiment, if a node is encountered for the second time, it indicates a cycle. In this case, the first in edge of the node is selected for breaking.

At step 1020*c*, breaking the edge having a start node, an end node, and a relation. If an edge (with a start node, end node and relation) is found in this process to break.

Figure 10C:
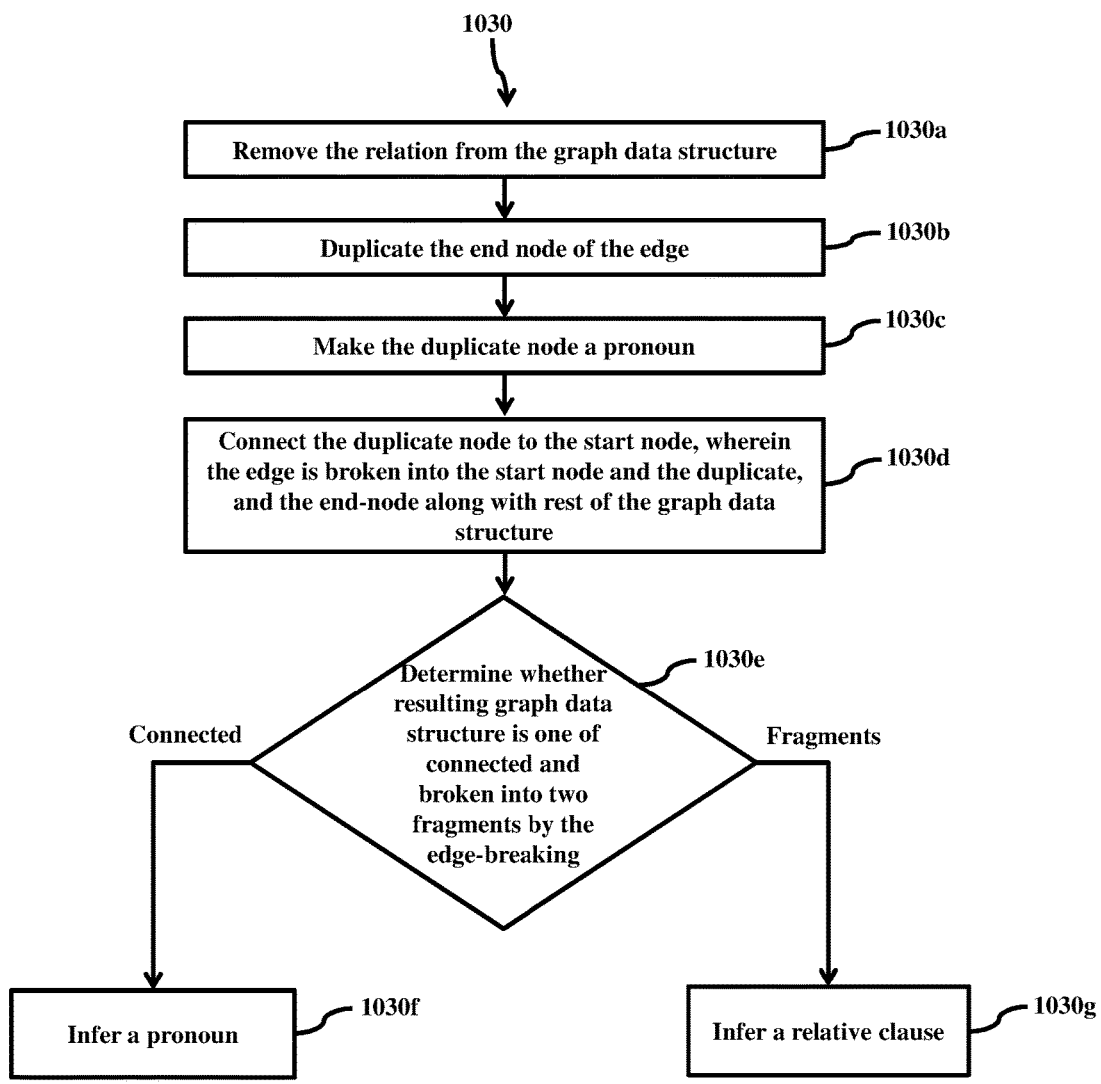
FIG. 10C is a flowchart illustrating a method for breaking an edge having a start node, an end node, and a relation, according to an embodiment of the present invention as disclosed herein.

FIG. 10C is a flowchart 1030 illustrating a method for breaking the edge having a start node, an end node, and a relation, according to an embodiment of the present invention as disclosed herein. The method includes:

At step 1030*a*, removing the relation from the original graph.

At step 1030*b*, duplicating the end node of the edge.

At step 1030*c*, making the duplicate node a pronoun. Since the "entry" attribute cannot be duplicated, the attribute is removed from the duplicate, if found.

At step 1030*d*, connecting the duplicate node to the start node, wherein the edge is broken into the start node and the duplicate, and the end-node along with rest of the graph representation. Now the edge is broken into two: one with the start node and the duplicate, but in which the duplicate has only one in-node which is the start-node; and another with the end-node and the rest of the graph, in which the offending in-node has been removed.

At step 1030*e*, determining whether the resulting graph representation is one of connected and broken into two fragments by the edge-breaking. At step 1030*f*, inferring a pronoun in response to determining that the resulting graph representation is connected. The new node is marked as a pronoun.

At step 1030*g*, inferring a relative clause in response to determining that the resulting graph representation is a fragment involves taking one of the two duplicate nodes, and creating a sub-graph out of all the nodes connected to it. The choice of which duplicate node to pick, is based on which fragment has the entry node. Further, a relationship between the remaining node and the new sub-graph is added. The relationship is called "ra" which stands for "right adjunct", a form of adjective relationship. Further, the new node is marked as an "RC (00.@whr)", which means it is a "wh"-word-signifying relative clause.

In an embodiment, if any edge has been broken, the method is rerun.

Figure 11A:
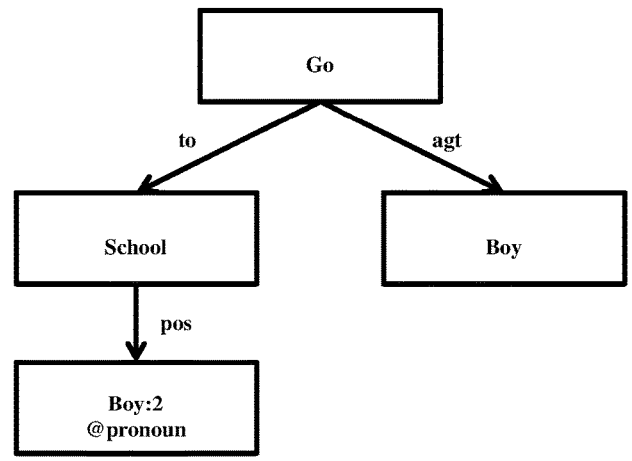
FIG. 11A shows an example of a sentence where a pronoun is inferred, according to an embodiment of the present invention as disclosed herein.

FIG. 11A shows an example of a sentence where a pronoun is inferred, according to an embodiment of the present invention as disclosed herein. Let's consider a sentence as "The boy goes to his school". A graph representing the sentence where the pronoun is inferred is shown in the FIG. 11A.

Figure 11B:
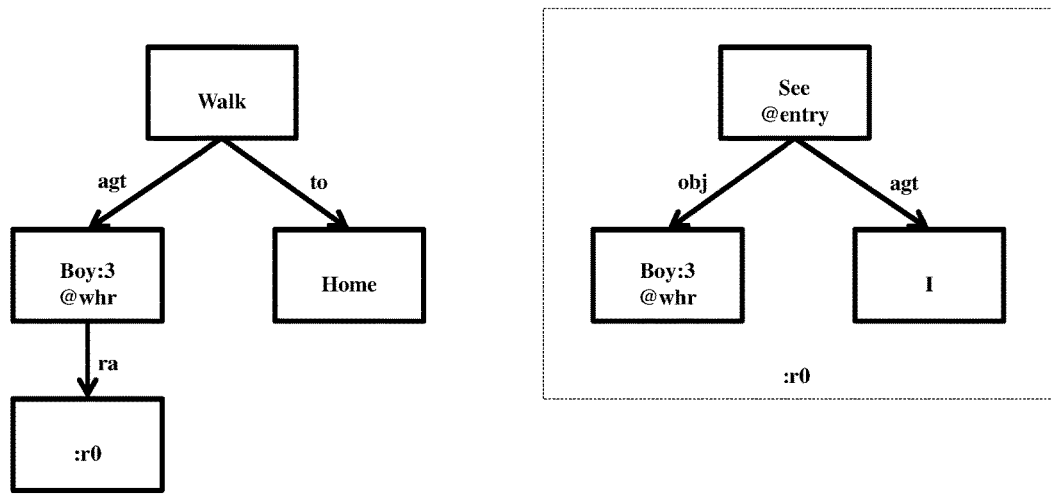
FIG. 11B shows an example of a sentence where a relative clause is introduced, according to an embodiment of the present invention as disclosed herein.

FIG. 11B shows an example of a sentence where a relative clause is introduced, according to embodiments at disclosed herein. Let's consider a sentence as "The boy whom I see is walking home". A graph representing the sentence with introduction of the relative clause is shown in the FIG. 11B.

Further, the methods herein include adding Lexical annotation and attributes from dictionary. For each graph node, the dictionary entry for that graph node is associated with it. The dictionary contains a number of properties of a word sense. It contains its root form, morphological properties, part of speech, and framing structure (transitive, intransitive, etc.).

In this process, explicit pronouns alone are handled differently: a special dictionary entry, called "PRO", is attached to it. Implicit pronouns are still given the dictionary entry of the word they represent.

In this process, a few new attributes may get added onto the node, derived from the dictionary. For example, the attributes @proper, @female and @male may come into the node from the dictionary. These are called "extended attributes" or "xattrs".

It is to be noted that a dictionary entry is not for a word, but for a word sense. For a word like 'trunk', for example, there are multiple meanings, and each has a separate dictionary entry. There may also be subtle shades of meaning for which separate dictionary entries are present. For example, "I want to talk" and "I want him to talk" have almost the same meaning, but would be represented as different word senses. A general rule of thumb (not always followed) is that if two meanings can be represented with the same picture, they would have the same dictionary entry; otherwise, they would be represented with different ones.

The frame is an elementary xtree which is projected from a word. The frame specifies the spec and complement arguments which are taken by the tree. Frames are usually very simple for nouns and adjectives, and show substantial variation only in the case of verbs. In one embodiment of the proposed system, the following table lists some examples of framing rules:

| FRAME | X-TREE STRUCTURE | CONSTRAINTS AND ATTRS |
|---|---|---|
| Noun | No spec, no complement | |
| Proper noun | No spec, no complement | PROPER attribute is set |
| Adjective | No spec, no complement | |
| Transitive verb | DP Spec, any complement | |
| Ditransitive verb di-animate (e.g. give the boy a book) | Shell - two VPs chained, both with DP spec. Lower verb has any complement. (Has 2 specs and 1 complement positions) | Both specs should have attribute ANM |

Further, the methods herein include creating elementary trees of the words. In this step, each node gets an x-tree associated with it. The creation of the x tree depends on the kind of node it is.

Figure 10D:
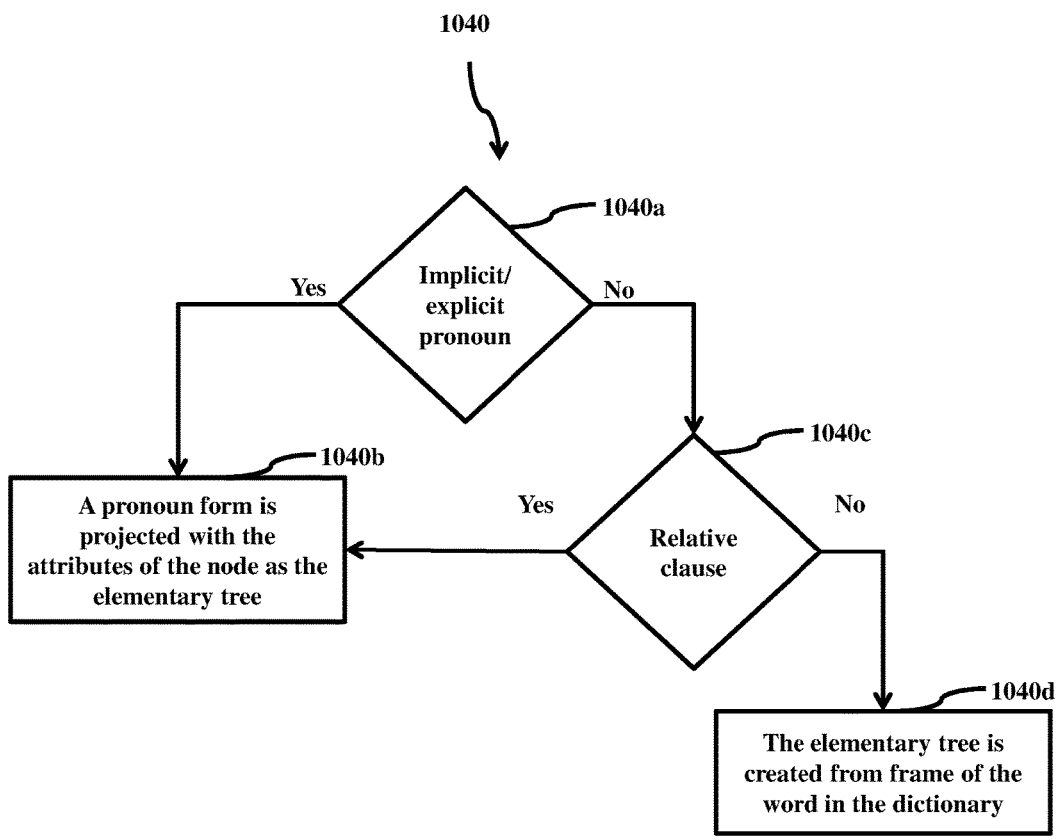
FIG. 10D is a flowchart illustrating a method for creating the elementary tree based on the kind of node, according to an embodiment of the present invention as disclosed herein.
Figure 10E:
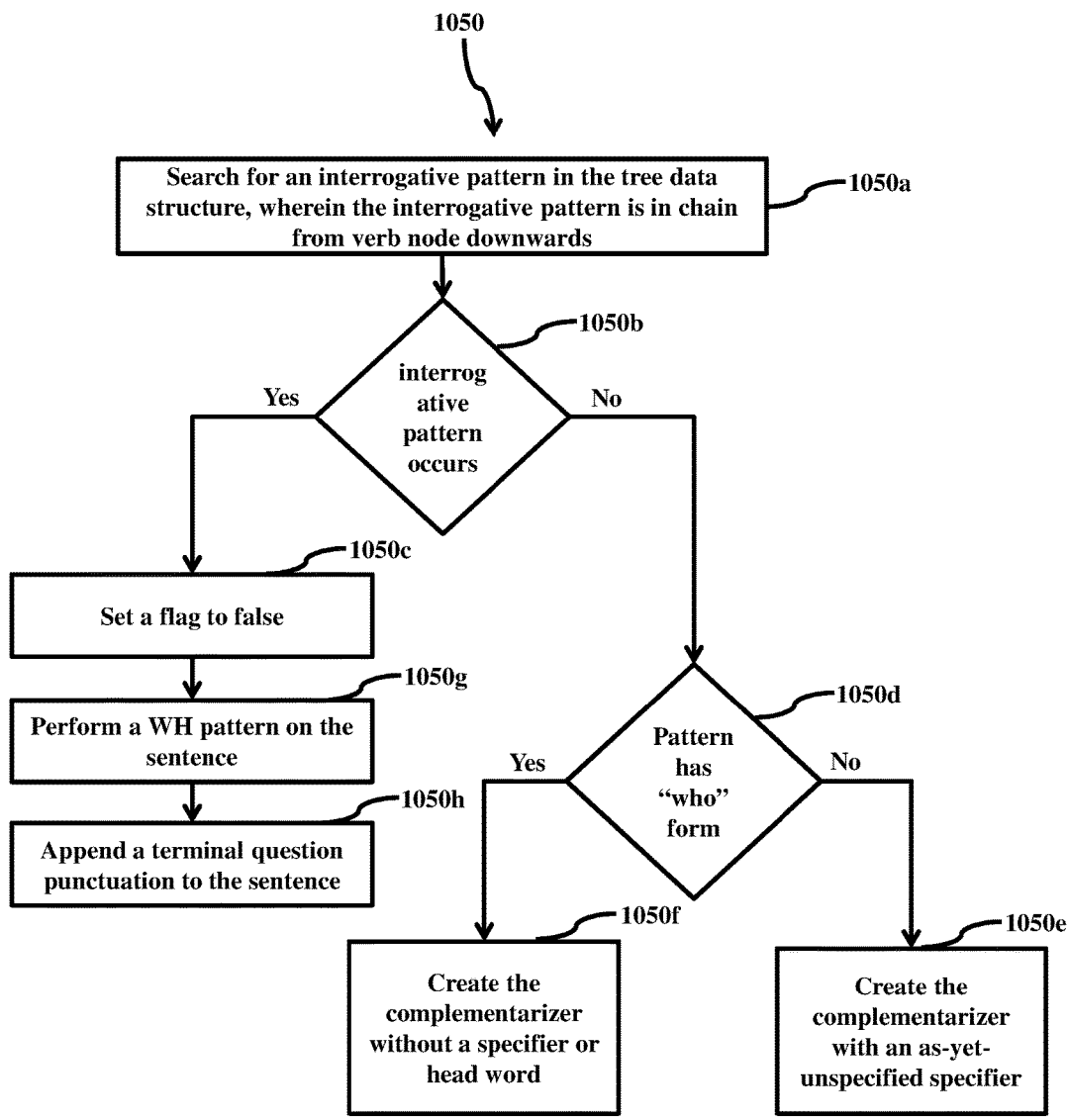
FIG. 10E is a flowchart illustrating a method for creating a Complementarizer Projection (CP) for a full sentence, according to an embodiment of the present invention as disclosed herein.

FIG. 10D is a flowchart 1040 illustrating a method for creating the xtree depends on the kind of node it is, according to embodiment described herein. The method includes the following steps:

At step 1040a, determining whether the node represents an implicit/explicit pronoun;

At step 1040b, if it is determined that as the implicit/explicit pronoun, caused by inference, a pronoun form is projected with the attributes of the node. (If inference cannot be done, a wildcard form with the name 'X' is projected.)

At step 1040c, determining that the node represents a relative clause in response to determining that it is not an implicit/explicit pronoun.

At step 1040d, if it is determined that it is not a pronoun and not a relative clause, the framing rule is created from the dictionary. A framing rule contains a "template" to create a tree. A tree is projected/created based on this template. For example, a template could be related to intransitive verbs or transitive verbs.

Further, at step 1040d, if it is determined that the node represents either an explicit pronoun or a relative clause, a pronoun form is projected with the attributes of the node.

The projection of pronoun form may include:
1. Inferring the type of the pronoun from its attributes.
2. Creating a basic tree with the part of speech inferred above.
3. Applying the default 3rd-person, if a person is not specified.
4. Inferring "animate" from the existence of the pronouns male, female, 1st/2nd person, and question pronoun.
5. Setting all the attributes of the node to the tree, setting the tree animate attribute if inferred, and setting the tree pronoun attribute.
6. Setting default noun-phrase attributes, like 3rd person, singular, neuter.

7. From the x-tree's attributes, propagating NP properties alone to the x-tree's word.
8. Setting the dictionary entry to none.

Projection of other elementary trees from a Framing Rule includes:
1. Transferring attributes of the node to the tree as properties.
2. Copying "Extended attributes" from the dictionary to the tree as properties.
3. Based on the kind of word (part of speech), projecting a higher-level "inflection tree" on top of the basic tree.

Now, the details of projection of "inflection tree" for various parts of speech follow.

Projection of the "Inflection Tree" for Verbs Includes:
1. Default properties are filled into the tree using attribute rules. For example, if no tense is specified, it is considered to be in the present tense. If no aspect/modality is specified (out of 'had', '-ing', 'can', 'may', 'should'), it is considered to be a 'do'-creating aspect.
2. The attributes are taken in sequence, starting from the one that associates most closely with the verb to the one that is most distant, and for each one, three things are done:
   a. A new Inflection Phrase (IP) tree is created with a relevant headword;
   b. The existing Inflection Phrase (IP) or Verb Phrase (VP) tree is substituted as the complement of the new tree; and
   c. A relevant morphological property is set for the headword of the existing IP or VP tree.
3. In one embodiment, some examples of rules to project trees from headwords, and set properties for the existing tree, are shown below:

| Attribute | Headword of new tree | Property added to old tree |
|---|---|---|
| continuous | be | _gerund |
| Anterior (perfect) | have | _participle |
| infinitive | to | None |
| simple | do | None |
| ability | can | None |
| future | will | None |

Then the past and present tenses add a morphological attribute to the last-created tree, _past and _present respectively. So, for example, the form "could have been going" works by:
1. Starting with "go"
2. Adding "be" and changing "go" to gerund (going)
3. Adding "have" and changing "be" to participle (been)
4. Adding "can" (no change to "have")
5. Changing "can" to past (could).

Note that the changes of morphological form do not actually happen at this stage; they are marked on the word, and take effect during morphological transformation, later.

If the node is negated, the morphological attribute "not" is added to the highest headword of the tree. If the node has an interrogative attribute, the property is set in the tree.

Projection of "Inflection Tree" for Nouns Includes:
1. Set default noun-phrase attributes, which in one embodiment for the English language are 3rd person, singular, neuter.
2. A generic Determiner Phrase (DP) tree is created (with the dummy headword '-det'), and the noun phrase (NP) tree is substituted in its complement position.
3. DP attributes from the NP tree are propagated upwards to the DP's headword. This is necessary for appropriate inflection of the article/determiner.

4. NP attributes from the NP tree are propagated downwards to the NP's headword.
5. If any of the node's attributes happen to be prepositional phrase (PP) attributes (like @in, @on), a PP is inferred.

Projection of "Inflection Tree" for Adjectives and Adverbs Includes:
1. For an adjective or adverb, the highest projection is a Magnification Phrase (MagP). Degree information (like more, most or neutral) is in the inflection of the adjective/adverb. The Adjective Phrase or Adverb Phrase (respectively JP or AP) is substituted in the complement position of the MagP.
2. Adjectival properties like "@more" and "@most" are propagated downwards to the headword of the JP/AP. This is in order to inflect the word (for example, to inflect big to bigger or biggest).

In an embodiment, an x-tree structure is defined as a building block of the syntactic structure of the system. The x-tree comprises of nodes, and each node has at least:
1. A label (the word it represents or the position in the tree)
2. Pointers to define the tree structure (left, right, parent)
3. A link to the tree to which the node belongs
4. Morphological properties of the word
5. If it is a position label (not a word), constraints on the kinds of trees that may be substituted in that position. (For example, some verbs project a tree whose spec position can only be an animate word.)

This x-tree structure has at least the following elements:
1. A structure which consists of a maximal projection (MP) node, one or more intermediate projection (IP) nodes, and a head (H) node.
2. Pointers to parent, specifier (spec) and complement (comp) xtrees (these pointers are pointers to nodes whose tree links are the actual trees substituted in these positions). The parent pointer is used for detaching a sub-tree from a main tree.
3. Pointer to adjunct x-trees (these pointers are pointers to nodes whose tree links are the actual trees substituted in these positions)
4. A "head" word. This usually contains a word sense. (The word is contained in the label of a node.)
5. Properties for the tree.

In an embodiment, a tree can have a 'trace' to another part of it. This may be represented by having the maximal projection (MP) node contain a trace id and have a trace pointer to another tree. The following operations can be defined on a tree:
1. Initializing with a pattern
2. Substitution of a tree
3. Adjunction of a tree
4. Detachment and movement of a sub-tree from one location to another
5. Leaf traversal and application of a function with accumulation of the result Searching/Pattern-Matching within a Tree In an embodiment, a template-matching engine allows for searching and pattern-matching within a tree. Templates allows structural (i.e. type), content (i.e. value), as well as property constraints to be specified as search parameters. For example, the pattern a pattern x (Complement z) matches x to a sub-tree and z to its complement. Constraints on x and z can be specified, for example [x is an IP, z is a VP]. In this case, the template will only match x to a sub-tree of type IP which has a complement VP. It is also possible to match along a complement chain (chain formed by a tree, its complement, and all complements of complements) by specifying a wild-card Complement*, so that x (Complement* z) with the same constraints [x is an IP, z is a VP] finds an IP which has a VP somewhere in its complement chain, returns the IP as x, and returns the VP as z.

Graph-to-Tree Rule Matching

A graph-to-tree rule (also called a semantic rule) consists of the following:
1. Edge pattern (a pattern describing an edge of the graph representation);
2. 2 node tree patterns (patterns describing the xtrees corresponding to each graph node of the graph edge);
3. An output pattern, which describes the way in which the two node trees are manipulated in the event of a match; and
4. The output variable The first two rule components are called the Left hand side (LHS), and the third and fourth are called the Right hand side (RHS). The output pattern consists of a tree pattern, along with various variables which are inferred from the rule matching phase; and properties that are to be applied on the trees if pattern match is successful.

Further, the methods herein include applying the graph-to-tree rules configured in the rule engine 104ba. In an embodiment, to apply the graph-to-tree rules, the graph is traversed in a particular order of edge types and checks each edge against a list of patterns of all possible semantic rules. When a match is found, the appropriate RHS action is taken. In an embodiment, a few caveats are described below:
1. When a relative clause is adjoined, the movements should be done in the imbedding clause before the adjunction. So the 'ra' relationship is alone handled differently. An example of why this is needed:
   "The man whose house I stayed in is my father's friend."—Here, 'wh movement' transforms the fragment "I stayed in whose house" to "whose house I stayed in". In the form that the 'wh movement' is currently written, this movement will not happen if the adjunction happens first (to form "the man I stayed in whose house").
2. When sub-graphs are encountered, the semantic rule check is done between the entry nodes of the sub-graphs.
3. When a rule is successfully applied, the method automatically 'relation-marks' the destination tree. This relationship marker is essentially a case-marker, which helps identify when a noun is to be inflected accusative (for example when it is the destination of an "obj" relationship) or nominative (for example when it is the destination of an agt relationship). This property is set, not only in the tree, but also as a morphological property of its word.
4. When the node search rule matches more than one possible position in a tree, only ONE of the positions is taken as the true match. The position is either the highest or the lowest, as specified in the rule.

Different Kinds of Graph-to-Tree Rules

Further considerations in graph-to-tree rule formation and application are detailed hereunder:
1. Searching for highest vs. lowest complements: In some cases, a template for a wildcard should match the lowest hit.
2. Adjunction order: When the output of a rule is an adjunction, the location at which the adjunction must be inserted follows a certain 'order of adjectives', in which the quantity (for example) associates farther from the noun than the modifier (which is why we say 'two red cars' instead of 'red two cars').
3. Creation of new properties: Sometimes, new properties are added due to rule application; for example, if the "qua" relation takes a number argument which is greater than one, the source of the "qua" relation should be made a plural.

4. Order of application: The semantic rules are to be applied leaf-inwards, i.e. starting at the leaves of the tree form of graph and moving towards the entry node. There is an order in which semantic rules should be applied to edges among sibling edges.

In a preferred embodiment, the more closely-associating relations may be handled first, before the more complex ones are handled. An example is the 'and' relation. Take the sentence "I went and he came". Here, if the 'and' relation between 'went' and 'came' is handled first to create the fragment 'went and came', it may not be possible to then affix the 'I' and 'he' in appropriate specifier positions (as the agent rule demands) because the information of which tree's specifier takes which argument will no longer be available.

5. Need for output variable: Sometimes, a relation is applied by creating an 'upper tree' in which one or both of the nodes are embedded. A typical example is the 'aoj' relationship. Take the semantic interlingua sentence: aoj (black, sheep). In this example, the MagP corresponding to black should be affixed to the complement position, and the DP corresponding to sheep should be affixed to the spec position, of the word 'is', to yield the sentence "the sheep is black". But note that when the nodes coalesce, the tree with head 'is' should be returned, and not either of the trees 'black' or 'sheep'. This is seen in the example 'I told him the sheep is black', in which the node-joining process should create the fragment 'the sheep is black' (headed by the word 'is') and then apply the content relation between 'tell' and this entire fragment.

Example Graph-to-Tree Rules for Different Relations in English

| | | |
|---|---|---|
| and, or | Binary relation between two entities of the same type (noun/verb/descriptor) | Create a CP with the head 'and'/'or' and complement y. Right-adjoin far to x. For nouns, mark x as plural. |
| agt | Agent relationship between a verb and a noun | Put y in the specifier of the highest verbal complement of x |
| obj | Object relation of a verb and all types | Substitute y in the lowest verbal complement of x. |
| gol | Goal relation of a verb and a noun (e.g. talk to him) | Create a PP with head 'to' and complement y. Adjoin right closely to x. Mark verb as di-transitive to trigger possible movement. |
| ben | Beneficiary relation of a verb and noun (e.g. bring a book for him) | Create a PP with head 'for' and complement y. Right adjoin closely to x. Mark verb as di-transitive. |

At step 1018, the method includes defining and applying movement rules, which are tree-to-tree transformation rules. When all the graph-to-tree relations have been processed in the graph, there remains only one, highest-level tree into which all the other have collapsed. This is the "D-structure" of the overall sentence. The next step is to convert this into the "S-structure" of the sentence through the application of movement rules.

Movement Rules

Figure 12A:
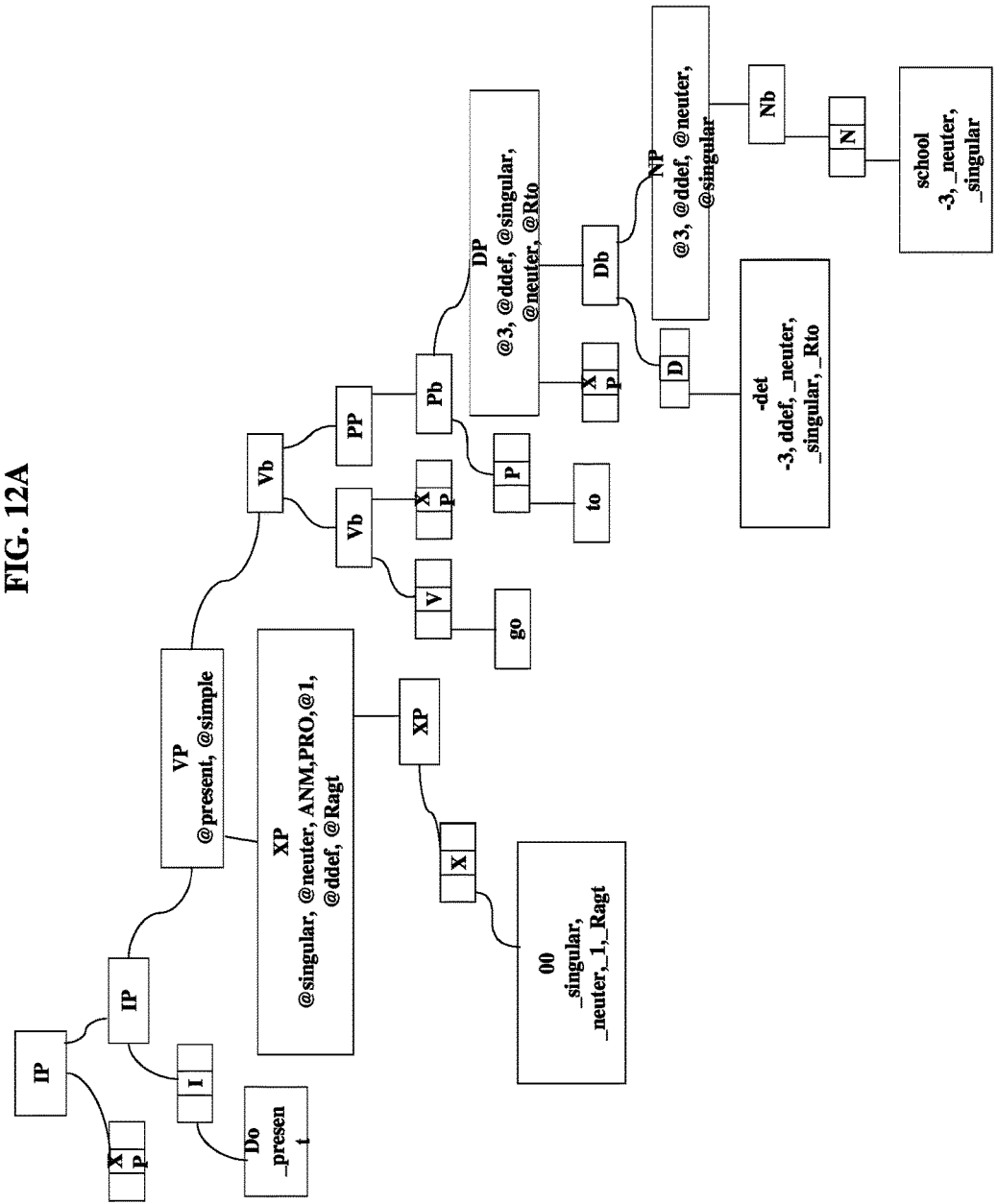
FIGS. 12A-12H shows examples of various movements, according to an embodiment of the present invention as disclosed herein.
Figure 12B:
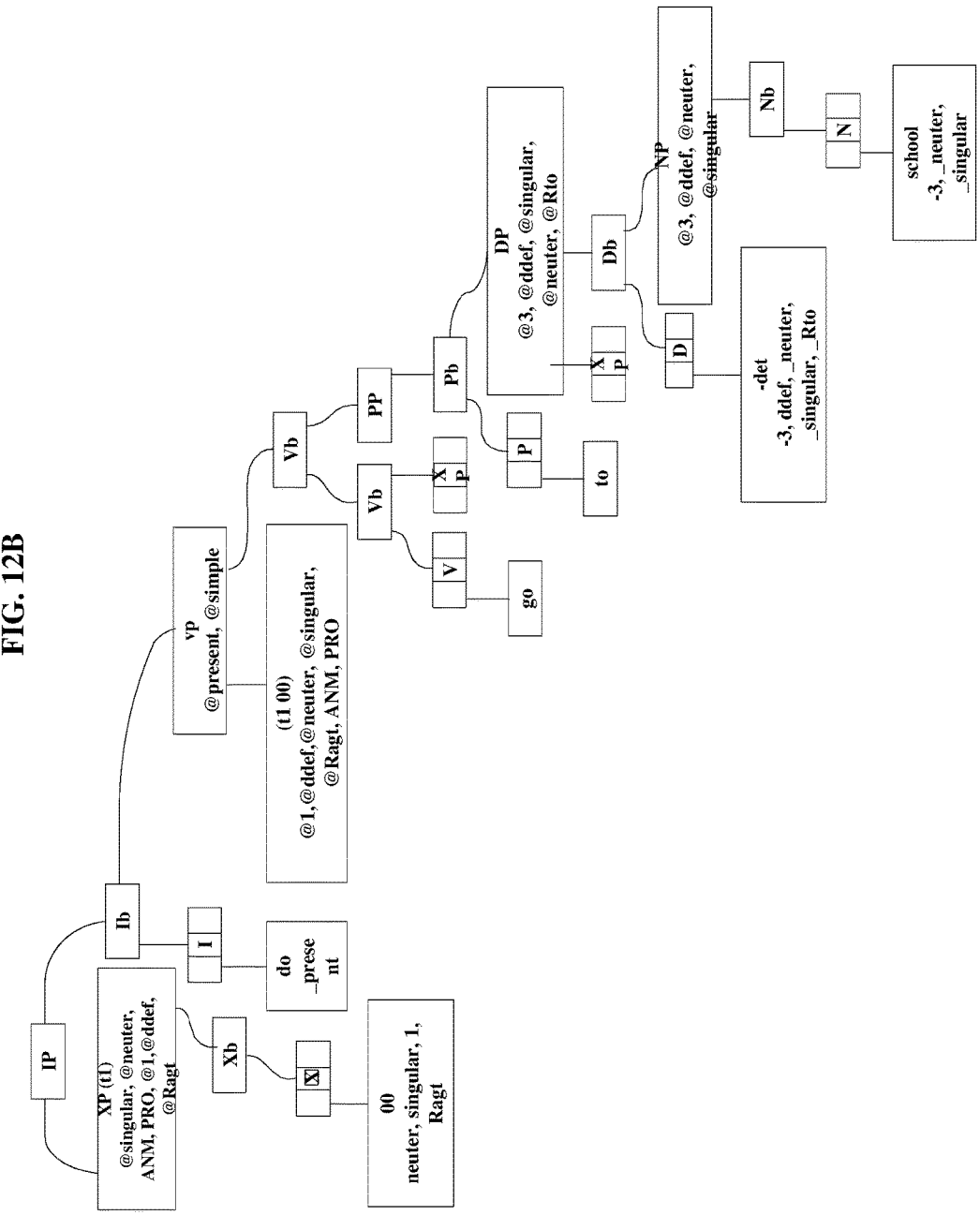

FIGS. 12A to 12H shows examples of various movements, according to an embodiment of the present invention as disclosed herein. Movement involves detaching a sub-tree from one location and attaching it to another. A movement rule contains three components: a pattern template and constraint set that identifies the sub-tree to detach, a pattern template and constraint set that identifies a location at which the sub-tree is attached, and an operation that specifies any further steps (such as copying or creating attributes) that accompany the movement. In an embodiment, one movement rule governs the movement of specifier of a verb from VP to IP, and up the IP chain (IP to IP). This move is needed to move the subject to the front of the sentence or clause. An example of VP to IP movement for a sentence: "I go to School" is shown in the FIGS. 12 and 12B, where FIG. 12A shows the tree before movements, and FIG. 12B shows the tree after movements.

Figure 12C:
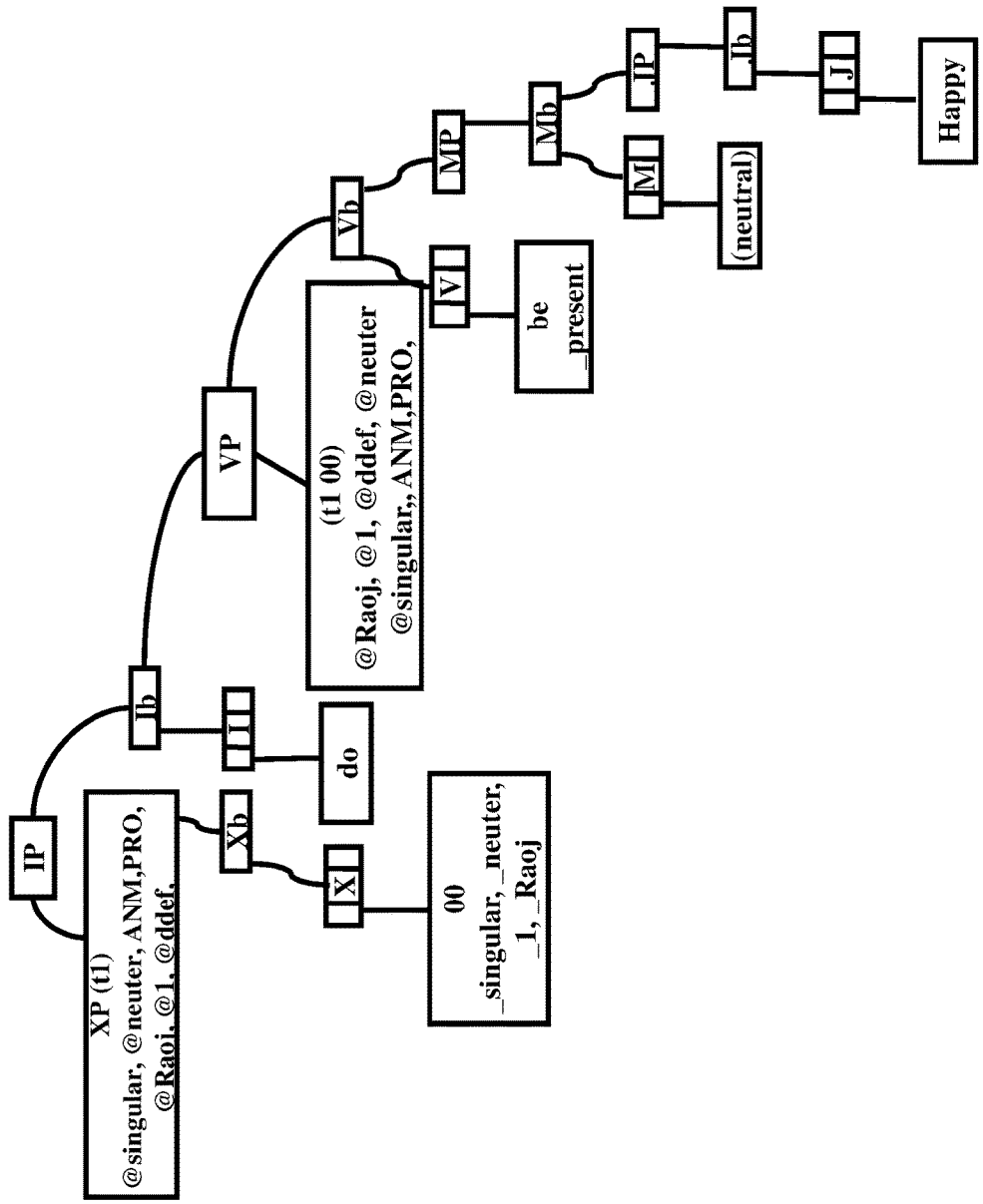
Figure 12D:
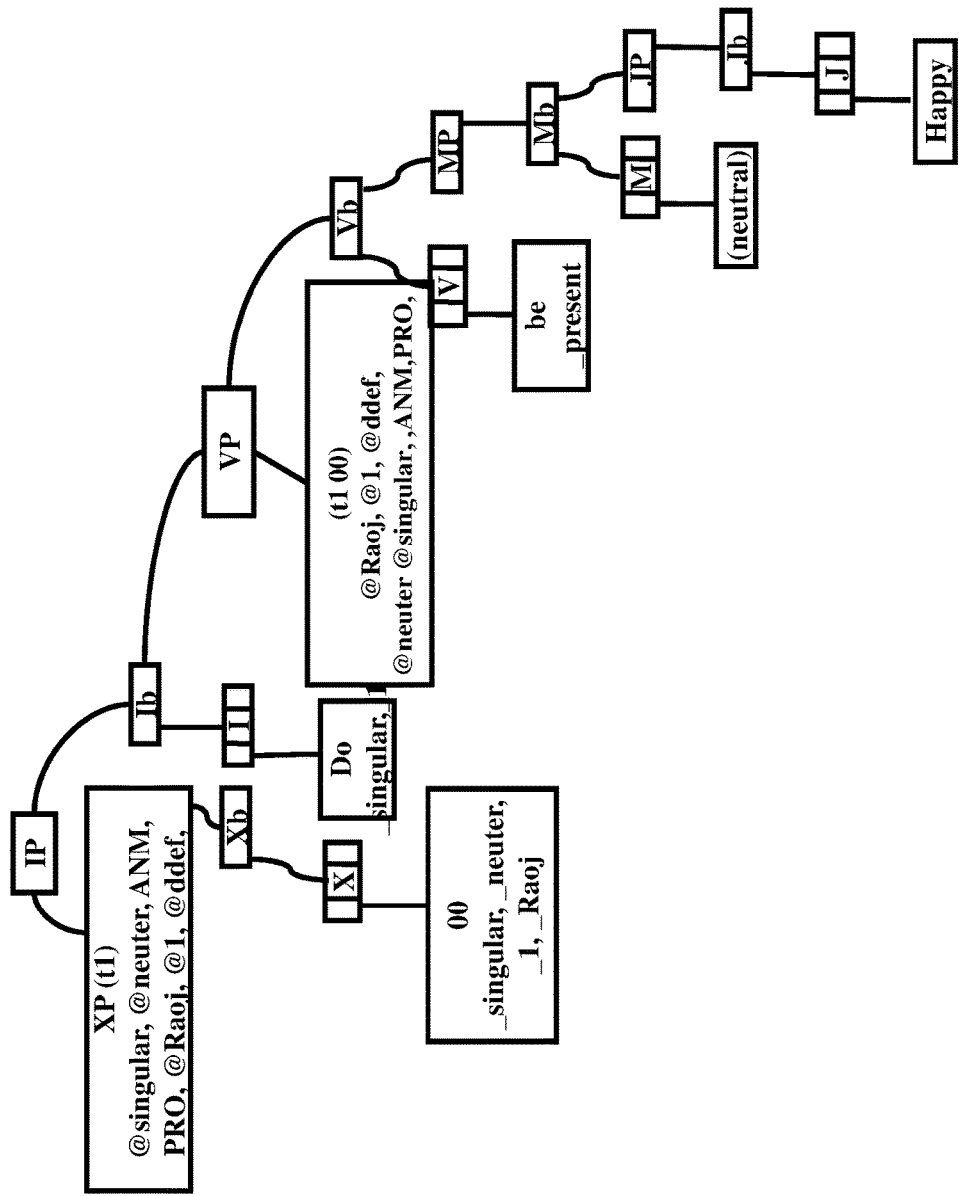

In an embodiment, copying the properties of the spec of a verb to its head (for inflection) is described. For example, the sentence "I am fine" vs. "you are fine"—the attribute @2 should descend from the subject to the noun. This is done by this movement. Note that in English, only the person ($1^{st}/2^{nd}/3^{rd}$) and number (sing/plural) are relevant for verb inflection. An example of the agreement movement for a sentence: "I am happy" is shown in the FIG. 12D, where FIG. 12C shows the tree before movements, and FIG. 12D shows the tree after movements.

Figure 12E:
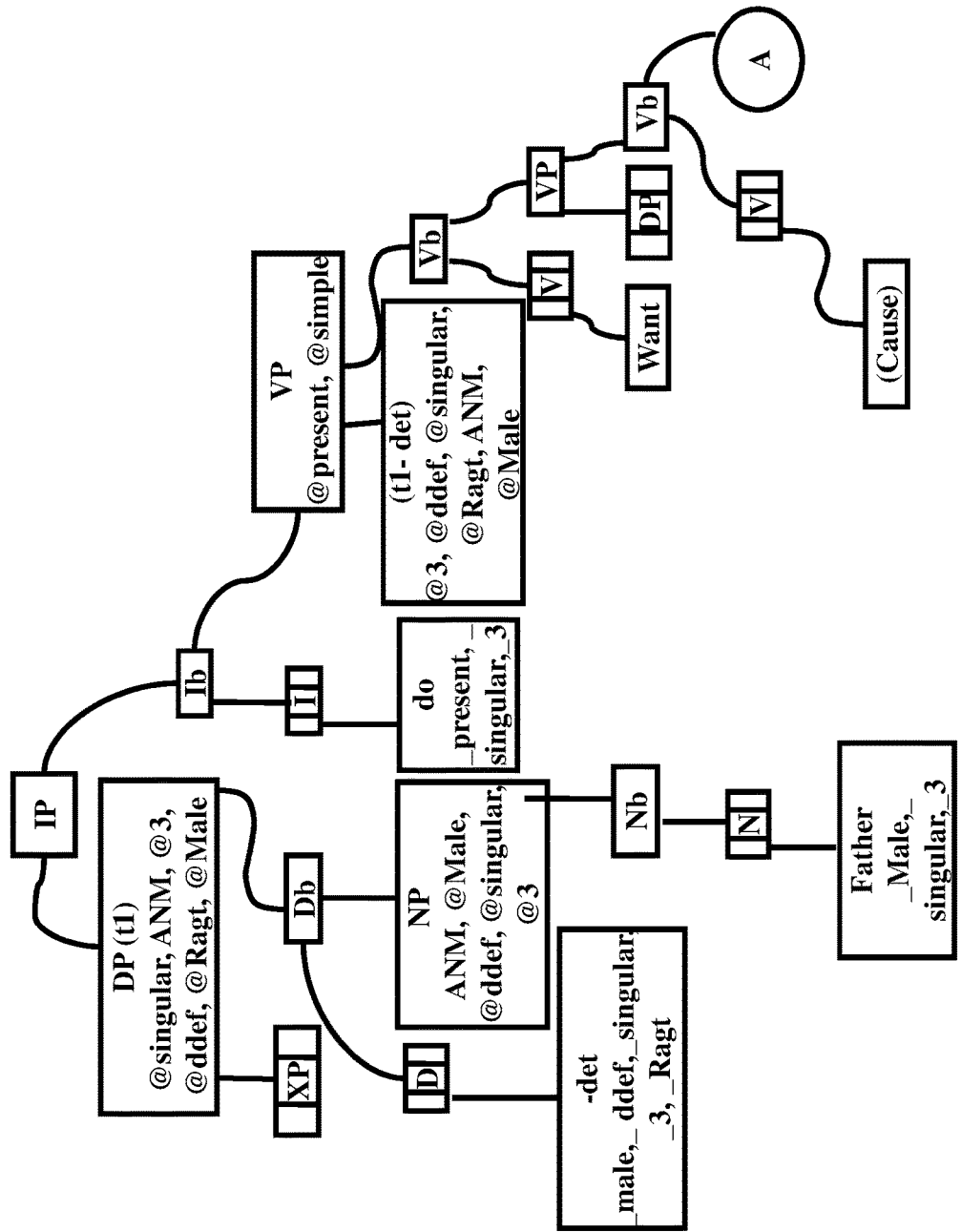
Figure 12E:
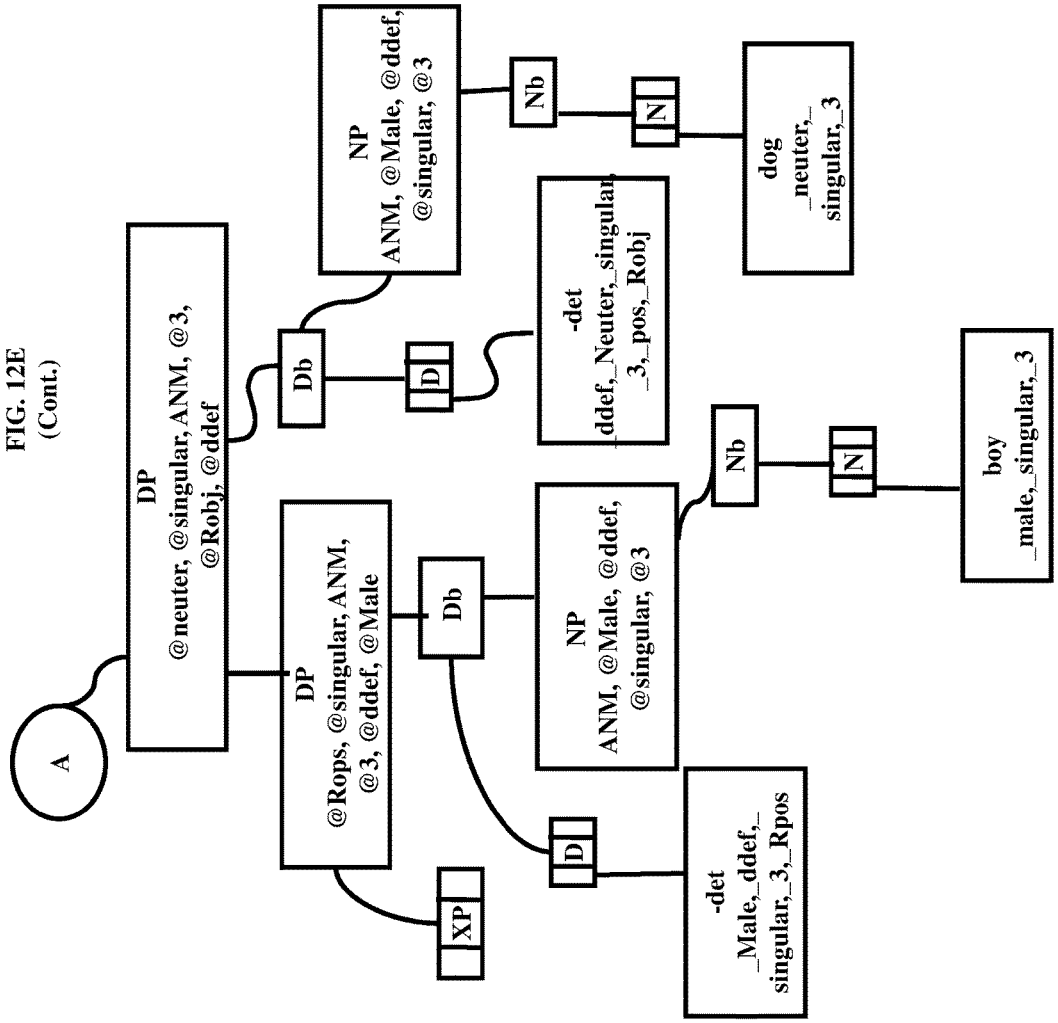
Figure 12F:
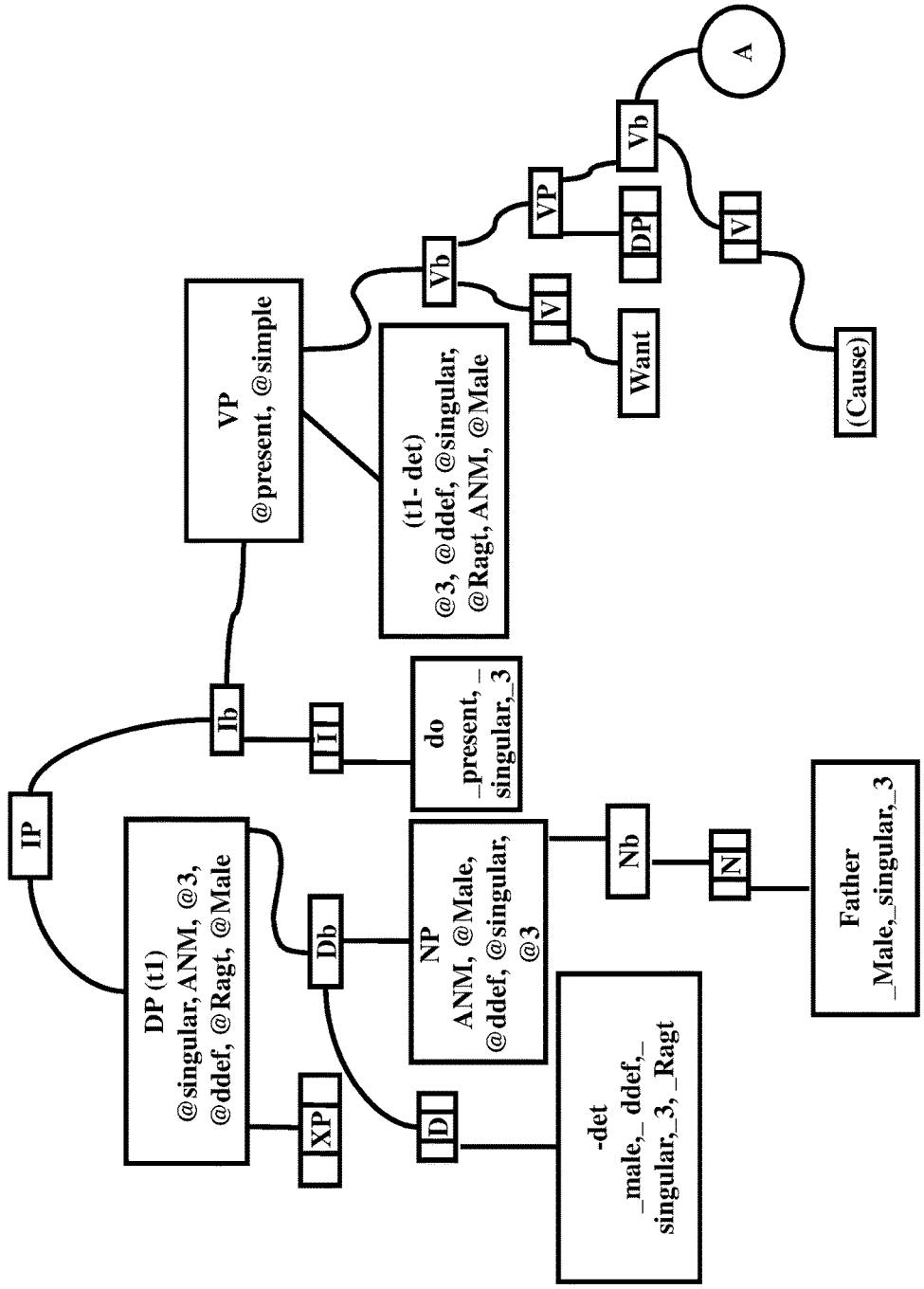
Figure 12F:
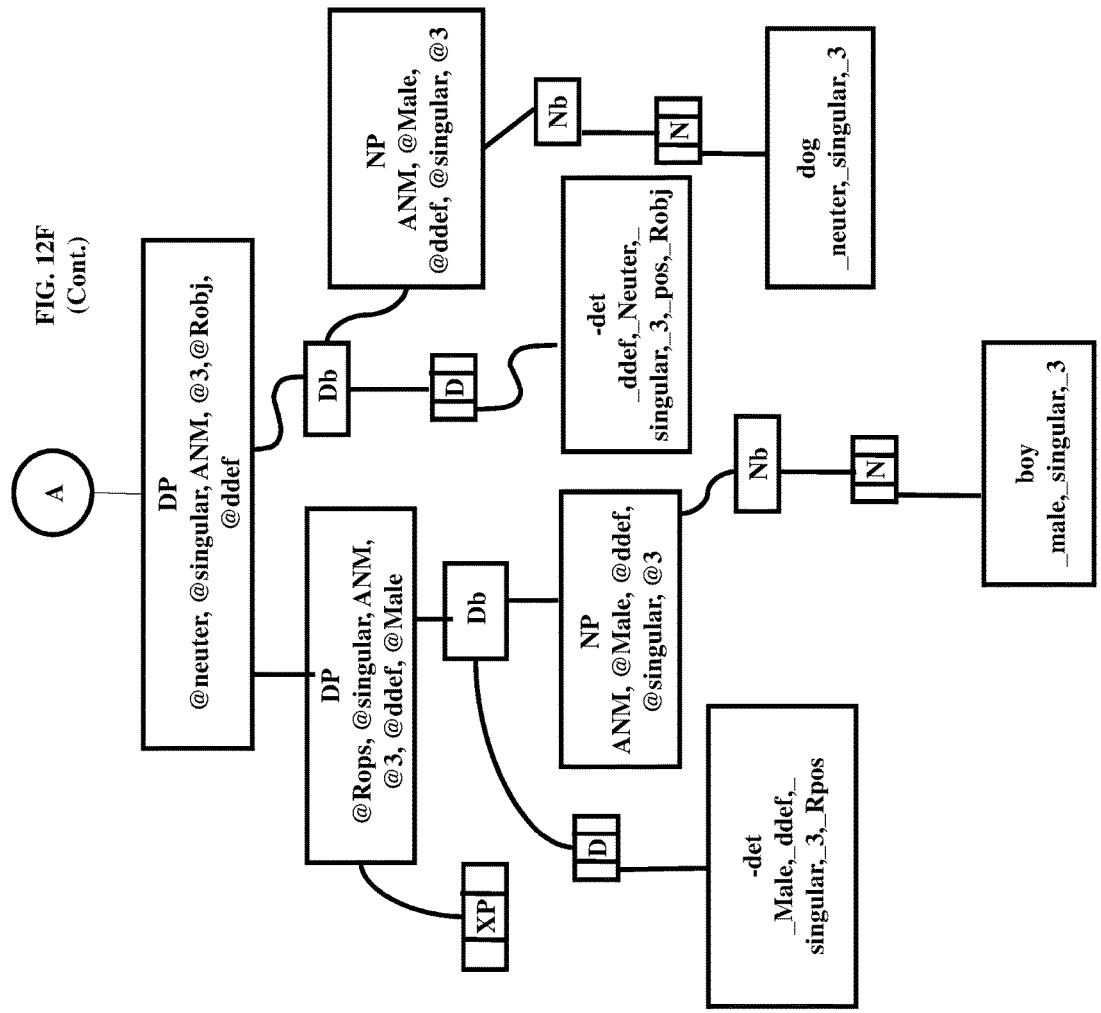

In an embodiment, setting the _pos morphological property to nouns whose DPs was in a pos relationship. This is how, for example, the word "man" in "man's brother" gets the possessive—the DP of 'man' gets annotated with @Rpos when it is relation-marked during semantic rule application. Then this @Rpos has to descend to 'man' so that it becomes man's. An example of the POS movement for a sentence: "The father wants the boy's dog" is shown in the FIGS. 12E and 12F, where FIG. 12E shows the tree before movements, and FIG. 12F shows the tree after movements.

At this step, the CP is created, as described in the section "CP creation".

Figure 12G:
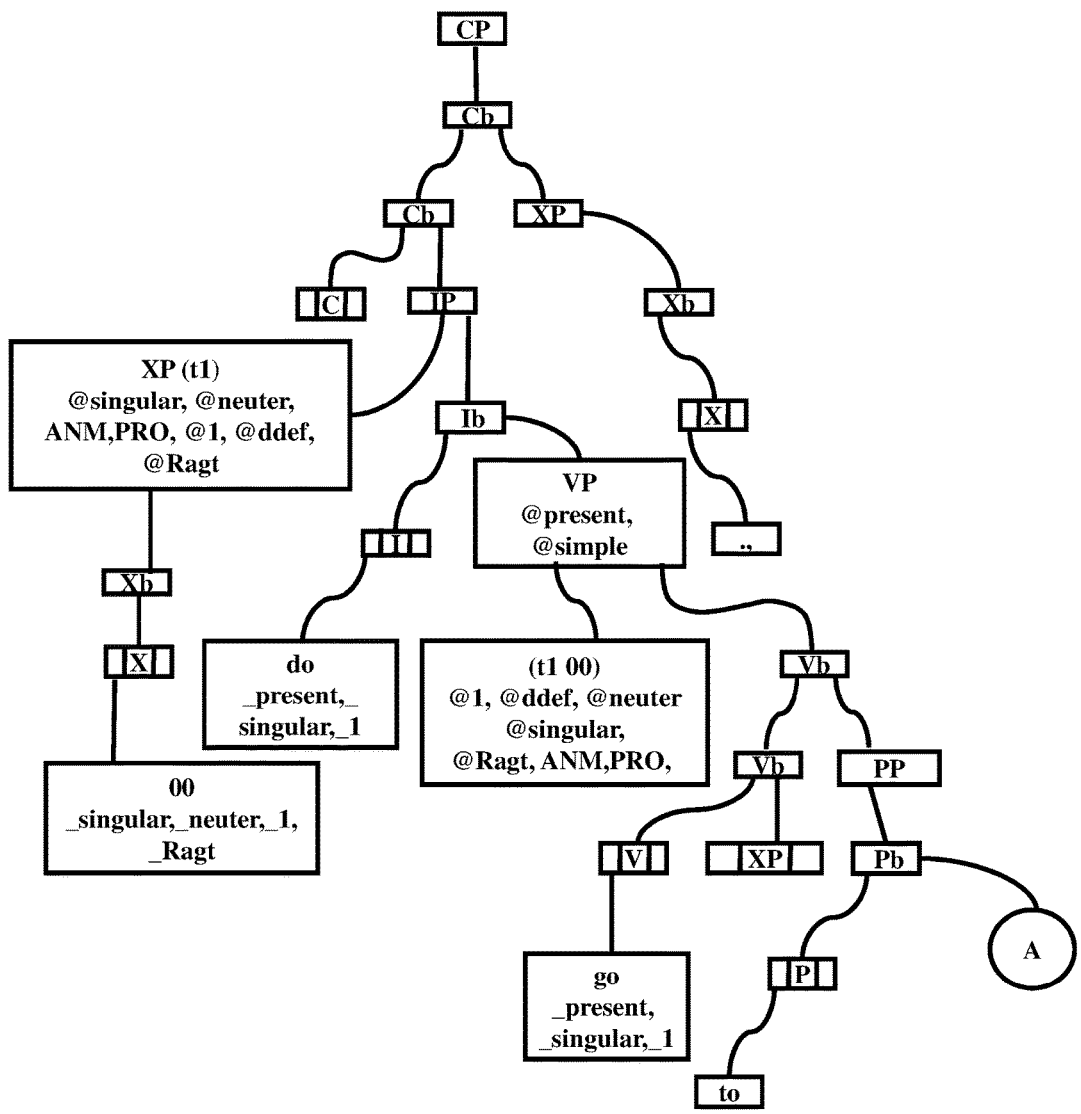
Figure 12G:
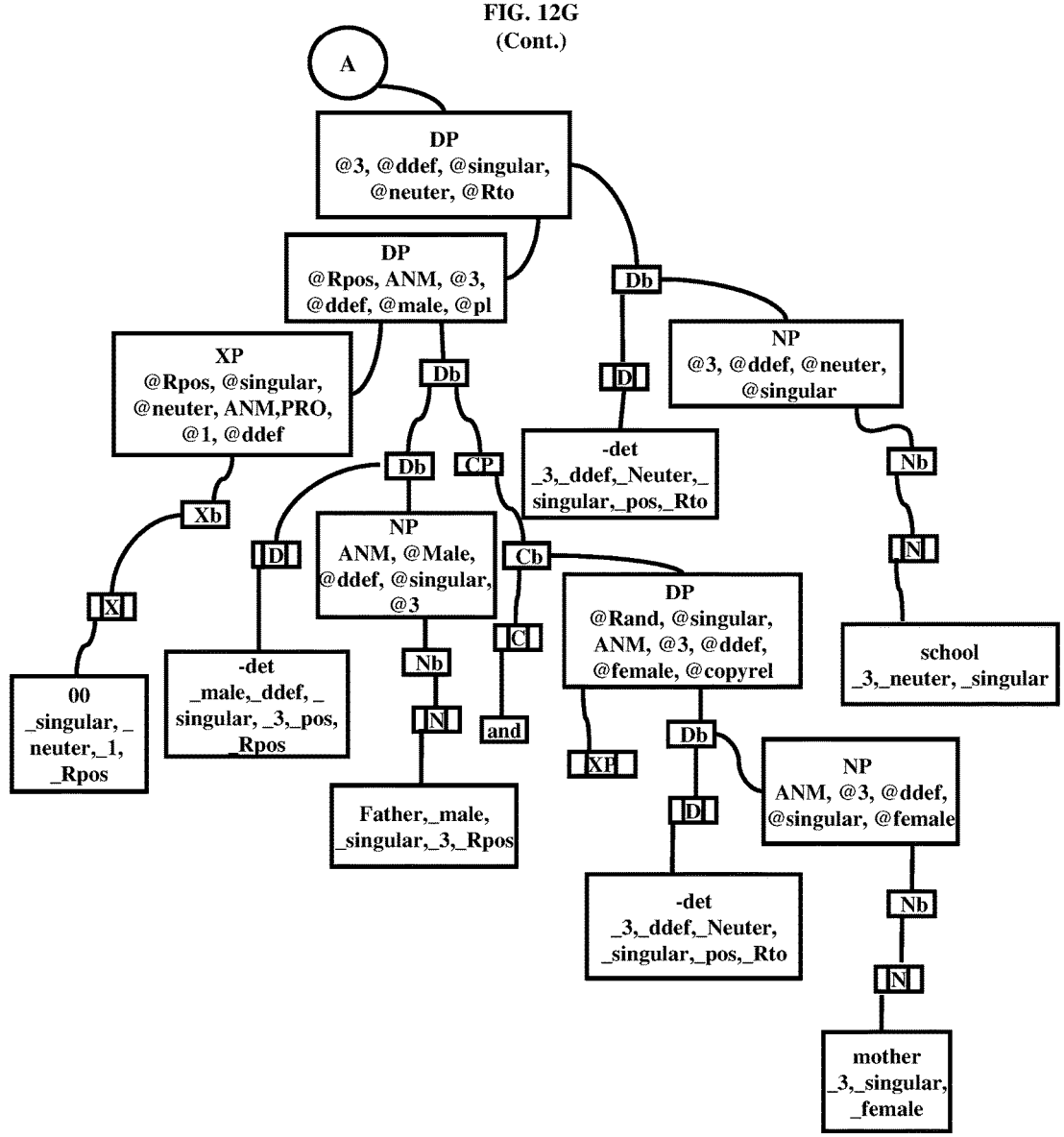
Figure 12H:
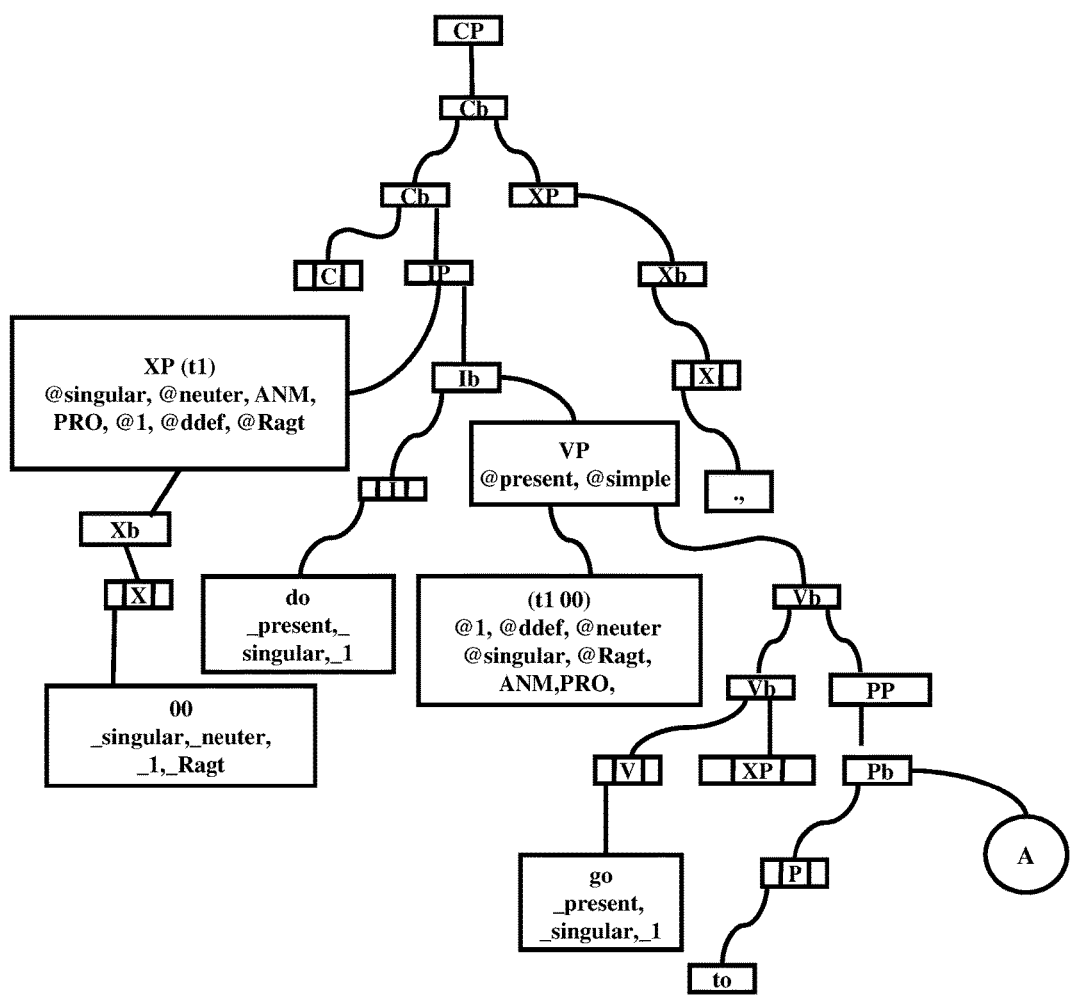
Figure 12H:
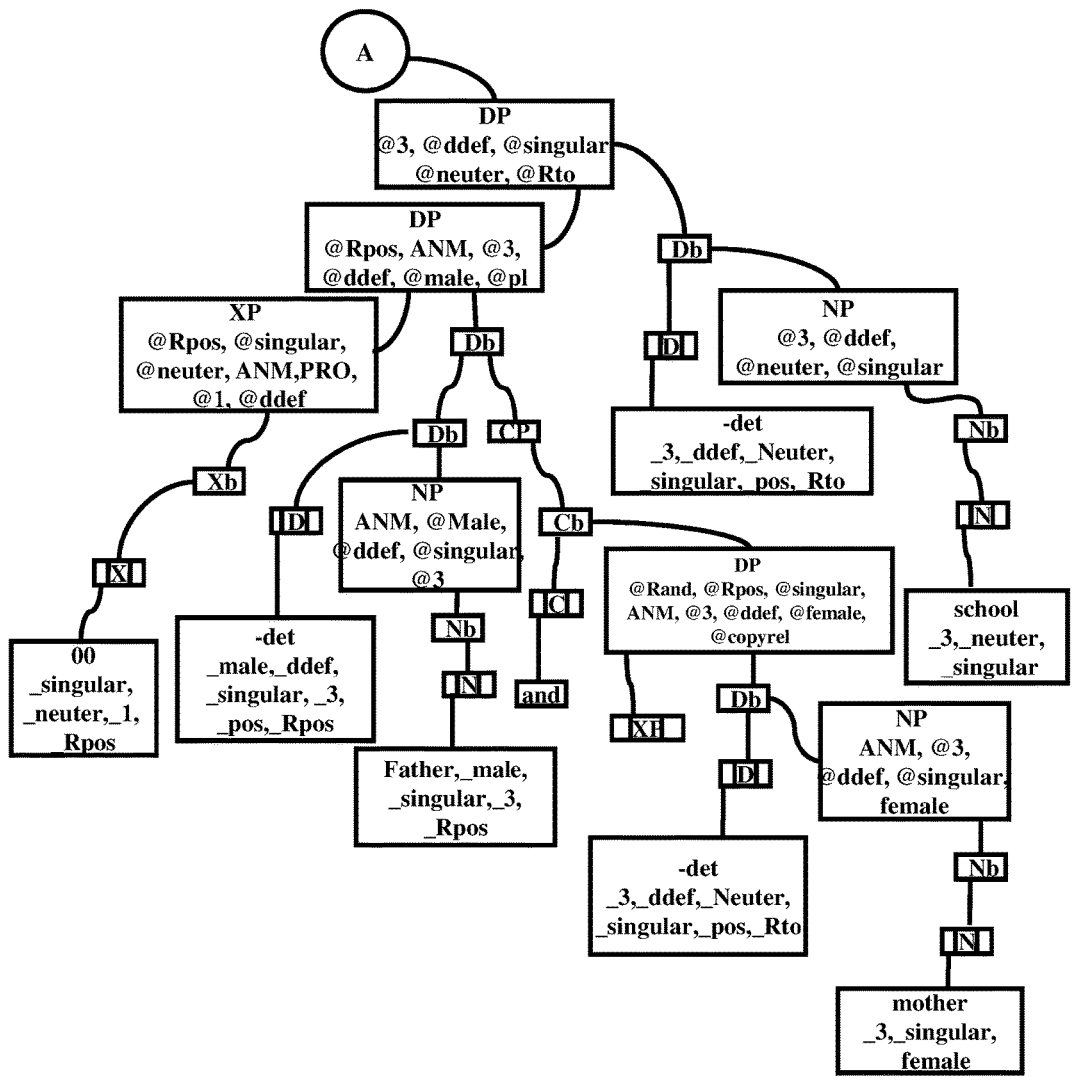

In an embodiment, copying relations for a conjunction is described. This is needed, because in the case of a sentence like "my brother's and my house", the morphology of possession should apply to both ends of the 'and' relationship. But in the semantic graph, it applies only to one. This movement transfers the morphological relationship attribute from one of the conjunction arguments to both of them. An example of the copy relation movement for conjunctions for a sentence: "I go to my father's and mother's school" is shown in the FIGS. 12G and 12H, where FIG. 12G shows the tree before movements, and FIG. 6H shows the tree after movements.

CP Creation

In the proposed system and method, the CP structure is created in the movement phase. The CP creation process takes the top most IP, and substitutes it in the complement position of a CP.

Figure 10F:
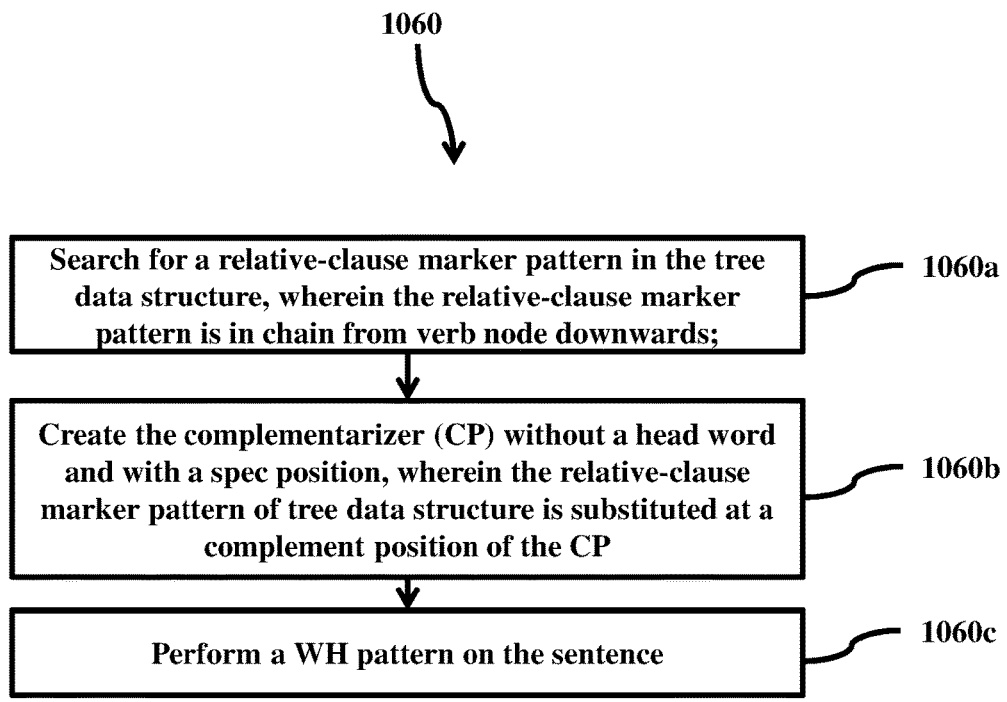
FIG. 10F is a flowchart illustrating a method for creating a CP for a relative clause, according to an embodiment of the present invention as disclosed herein.

FIG. 10F is a flowchart 400f illustrating a method for creating a CP for a full sentence, according to embodiment described herein. In an embodiment, the method includes:

At step 1050a, searching for an interrogative pattern in the tree representation, wherein the interrogative pattern is in chain from VP downwards. In an embodiment, search for an interrogative pattern somewhere in the tree (starting from the VP). The interrogative pattern is simply the pattern "Q (00.@wh)" somewhere in the chain from the VP downwards.

At step 1050b, determining whether the interrogative pattern occurs. At step 1050c, setting a flag to false in response to determining that the interrogative pattern occurs.

If the interrogative pattern occurs on a node that is marked with the attribute "@Ragt", i.e. it is case-marked as an agent (asking the question "who"), a flag called "ISNTWHO" is set to FALSE. This is because in English the question "who" alone does not have a movement/do-substitution. E.g., the D structure sentence "I gave the book to whom" gets transformed to "whom did I give the book to", where the word "whom" moved to the CP's head and the word "did" is retained. However, the sentence "Who gave the book to him" does not feature the word "did". Thus, "who" has to be handled separately. For example, the D structure sentence "I gave the book to whom" gets transformed to "whom did I give the book to", where the word "whom" moved to the CP's head and the word "did" is retained. However, the sentence "Who gave the book to him" does not feature the word "did". Thus, the word "who" has to be handled separately.

At step 1050*d*, determining whether the sentence is in "who" form. At step 1050*f*, if the "Q (00.@wh)" pattern does occur in the sentence, and it is not a "who" form, then the sentence is an interrogative sentence. It is marked with the attribute @interrogative. The CP is created with an as-yet-unspecified specifier. The head of the top IP is detached and is inserted as the CP's head. (This is usually the word "do".) The top IP is attached to the complement position of the CP.

At step 1050*e*, if the pattern does not occur, or if it is the "who" form, then the CP is created without a specifier or head word, and the top IP is substituted in the complement position of the CP. Note that polar questions do not feature the "Q (00.@wh)" pattern. Instead, the head IP is marked with the attribute @interrogative directly in the input.

At step 1050*g*, WH movement is done on the sentence, as described below. At step 1018*h*, appending a terminal punctuation to the sentence. This is done if the search for "Q (00.@wh)" resulted in any positive matches (regardless of whether it is a "who" or not), OR if the sentence is marked with a @interrogative. The latter can happen without the former in the case of polar (Y/N) questions. If either of these conditions holds, the terminal punctuation is a question-mark ("?"). Otherwise, it is a period ("."). The punctuation is added to the tree by creating a basic xtree and right-adjoined to the CP.

FIG. 10F is a flowchart 1060 illustrating a method for creating a CP for a relative clause, according to embodiment described herein. The method includes the following steps:

At step 1060*a*, searching for a relative-clause marker pattern in the tree data structure, wherein the relative-clause marker pattern is in chain from VP downwards. In an embodiment, search for a relative-clause marker pattern somewhere in the tree (starting from the VP). The relative-clause pattern is simply the pattern "RC (00.@whr)" somewhere in the chain from the VP downwards. Note that this is different from the question pattern "Q (00.@wh)" and is introduced into the tree during the graph-to-tree conversion.

At step 1060*b*, if the relative-clause marker is found, a CP is created without a head word and with a spec position, and the tree is substituted in the complement position of the CP.

At step 1060*c*, performing a WH pattern on the sentence. This is called "Relative WH movement" and is described below under the "movement rules" section of the description.

At the end of movement application, the final tree always has the following form:
1. The top-most tree is a "CP", which defines the sentence structure. The CP may also include punctuations,
2. In some instances, the CP may be followed by more CPs.
3. Beneath the CP is a sequence of "IPs" which ends in a VP. This VP is the main verb of the sentence.
4. The rest of the sentence is in various specifier and complement positions of the CP/IP/VP tree.

Morphology Rule Application

The methods herein further include defining and applying morphology rules.

At this stage, the leaves are not yet 'words'—they are word-nodes with various attributes. The transformation of these word-nodes to words is a morphological operation (where the attributes cause the words to take on various tense, aspect and agreement related forms) and is the step required for converting the tree form of a sentence into a linear form. The linear form may require further transformations to result in a sentence.

In one embodiment, morphological transformation includes the following rules:
1. Some words are unvoiced, represented by putting them in brackets. These words have an empty morphological transformation.
2. Prepositions are not inflected; the word is directly returned.
3. Pronouns are inflected as follows:
    a. Question words, indicated by _wh, are transformed based on the relation-marker into questions like who, whom, what, or the like.
    b. Personal pronouns are transformed based on person, number, gender and semantic role.
4. Determiners are inflected as follows:
    a. For modifier and possessive semantic roles, no determiner is voiced.
    b. The other determiners are inflected from the attributes defined on them. This includes the determiners these, this, that, those, the, and a.
    c. In other cases, determiner morphologies are suppressed. One is for indefinite plurals, which in English do not appear to have a voiced determiner.
5. Nouns are inflected in English for plural and possession.
6. Verbs (and IPs and CPs) are inflected based on negation, word form, person and number.
7. Adjectives are inflected based on comparative or superlative forms.
8. All other words—including adverbs—do not have inflections and the lemma is directly returned.

Sequence Transformation Rules

Further, the methods herein include handling sentence operations using sequence transformation rules. In an embodiment, some sentence operations appear to operate on the final list of words, and these sentence operations are handled by the sequence transformation rules. These rules operate on the list of words.

Further, the methods herein include convert the sequence of words into a sentence. In an embodiment, this involves a few steps additional to just listing the words separated by spaces, and those steps include:
1. Capitalizing the first word of a sentence (including the first word within quoted speech)
2. Conversion of 'a' to 'an' when followed by a word beginning with a vowel
3. Adding quote marks around quoted speech, and inserting a comma before the quote starts The final output, then, is a sentence which is a faithful reproduction of the semantic input.

The various actions, acts, blocks, steps, and the like in flow chart 1000*g* may be performed in the order presented, in a different order or simultaneously. Further, in some embodiments, some actions, acts, blocks, steps, and the like may be omitted, added, modified, skipped, and the like without departing from the scope of the invention.

Although the example embodiments use a specific example of an interlingua that the conversion system is able to convert to English, it is to be understood that other embodiments are not limited thereto. Specific reference has been made to U.S. Pat. No. 8,712,780 to Ajit Narayanan. (Dec. 8, 2010) entitled "Systems and methods for picture based communication", for a brief discussion on picture based interlingua. While some of the example embodiments described herein use a picture based interlingua to convert to the natural language English, the conversion system disclosed is capable of converting a large class of generic, semantically-oriented interlingua into any natural language. Further, it will be evident that the proposed system can more broadly be applied to convert any small or large class of interlingua into a set of natural languages.

The embodiments disclosed herein can be implemented through at least one software program running on at least one hardware device and performing network management functions to control the network elements. The network elements according to various embodiments include blocks which can be at least one of a hardware device, or a combination of hardware device(s) and software module(s).

It is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein The method embodiments described herein could be implemented in pure hardware, or partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A computerized method for picture based communication, the method comprising:
    presenting, by a user interface module, a plurality of pictures to a user on a screen of a device;
    receiving, by said user interface module, at least one picture selected by said user;
    receiving, by said user interface module, one or more attributes of at least one picture selected by said user;
    constructing, by a graph generation module, at least one connected graph in semantic interlingua, wherein said at least one connected graph is made of words and relationships with said selected at least one picture;
    generating, by a sentence generation module, a sentence in at least one target language based on said at least one connected graph, said generation further comprising:
        generating a graph representation from said connected graph in said semantic interlingua using at least one graph rule applied by a rule engine;
        generating separate tree representations for each node in said graph representation, wherein said tree representation is generated based on at least one graph-to-tree rule applied by said rule engine;
        generating a cumulative tree representation based on said separate tree representations, wherein said separate tree representations are analyzed based on at least one graph to tree rule, and cumulative tree representation is analyzed by at least one tree rule, applied by said rule engine, wherein analyzing at least one graph further comprises:
            traversing said graph representation node-by-node, wherein said graph representation is traversed from an entry node and proceeding outwards along edges,
            selecting edges in said graph representation from among those which create a cycle in the graph, or which cause an entry node to have at least one input edge, cause a node that is not an entry node to have two or more input edges, and cause a node to have more than one input edges of give type,
            forming said selected edges, breaking edges having a start node, an end node, and a relation, and
            transforming said cumulative tree representation into said sentence in said at least one target language, wherein said cumulative tree representation is transformed based on at least one sequence transformation rule applied by said rule engine; and
    communicating, by an output module, said sentence in said at least one target language to a party receiving said communication on said device in a mode as configured by the user, wherein said communicating comprises causing to display said sentence on said screen of said device, wherein said at least one target language is based on an input representing mode of communication received from said user.

2. The method of claim 1, wherein said method further comprising:
    predicting, by a prediction module, relations, words and attributes based on said sentence, wherein the prediction comprising:
        determining feasible attributes to a selected word from said sentence; determining feasible relations to said selected word; and
        determining feasible words for at least one relation from said feasible relations, wherein said predicted relations, words, and attributes are presented to the user for further selection to construct a sentence.

3. The method of claim 1, wherein said graph representation comprises a plurality of graph nodes indicating at least one of a word sense with annotations, a set of attributes, a special identifier indicating a sub-graph, and a list of edges.

4. The method of claim 3, wherein each said graph node is associated with a dictionary entry, wherein said dictionary entry comprises at least one of root form of said word sense, morphological properties, parts of speech, semantic attributes, and framing structure.

5. The method of claim 1, wherein generating said graph representation from said connected graph in said semantic interlingua using at least one graph rule from the rule engine comprises:
enumerating all sub-graphs;
creating an empty graph for each said sub-graph; converting each unique node of an edge of the connected graph into a corresponding unique node of the graph representation;
converting each node of an edge into a unique node when either endpoints are pronouns, wherein each said edge comprises at least two nodes;
creating a map for mapping node identifiers to each said node; setting an entry point for each sub-graph; and
adding said edge as a relation to said two nodes.

6. The method of claim 1, wherein at least one of said word sense, annotations, set of attributes, special identifier indicating sub-graph, and list of edges associated with each said graph node in said graph representation defines a transformation of said graph node, wherein said graph node or graph structure is modified based on at least one graph rule.

7. The method of claim 6, wherein said graph rule comprises of a pattern that specifies that an attribute is one of, exactly one of, or a maximum of one of a given list of attributes.

8. The method of claim 6, wherein said graph rule comprises graph pattern, constraints on said pattern, and output operation.

9. The method of claim 1, wherein breaking an edge having a start node, an end node, and a relation comprises:
removing said relation from said graph representation; duplicating said end node of said edge;
marking said duplicate node with a pronoun attribute or a relative clause attribute, depending on whether the resulting graph is connected or a fragment;
connecting said duplicate node to said start node, wherein said edge is broken into said start node and said duplicate, and said end-node along with rest of said graph representation; and determining whether resulting graph representation is one of connected and broken into two fragments by the edge-breaking.

10. The method of claim 1, wherein said separate tree representation comprises:
a tree structure representing a syntactic structure for each graph node, wherein said tree structure comprises a maximal projection node, at least one of an intermediate projection node, and a head node;
pointers to children nodes; and
properties for said tree representation.

11. The method of claim 1, wherein said separate tree representation comprises a trace pointer to another part, wherein said trace pointer to another part is represented by a trace maximal projection node.

12. The method of claim 1, wherein operations performed on said separate tree representation comprises at least one of initializing with a pattern, substitution of another separate tree representation, adjunction of another separate tree representation, detachment and movement of a sub-tree from one location to another using at least one movement rule, leaf traversal and application of a function to all the traversed leaves with accumulation of result of the function.

13. The method of claim 12, wherein said at least one movement rule comprises pattern to find source of movement, pattern to find destination of movement, and operation to be performed if both source and destination patterns are found.

14. The method of claim 13, wherein operation to be performed on cumulative tree representation if both source and destination patterns are found is one of:
movement of sub-tree to a given vacant node;
movement of head to a given head node;
copying properties from one tree structure to another;
setting properties on given tree structure; removal of sub-tree; and
changing the word of a sub-tree.

15. The method of claim 1, wherein said at least one graph to tree rule is defined using at least one of an edge pattern in said graph representation, two node patterns in said graph representation, an output pattern in said tree representation, and an output variable in said tree representation.

16. The method of claim 1, wherein said at least one graph to tree rule is applied by traversing said graph representation in an order of edge types, and checking each said edge against a list of patterns of all possible graph to tree rules.

17. The method of claim 1, wherein said graph to tree rules pairwise coalesce separate tree representations associated with each graph node in said graph representation to create said cumulative tree representation that comprise all the sub-trees in various substitution and adjunction positions.

18. The method of claim 1, wherein said cumulative tree is transformed by:
searching for a pattern in said cumulative tree representation, wherein said pattern is in a given chain within the tree representation, and which matches given constraints on the pattern;
and performing a tree transformation operation on said sentence.

19. The method of claim 18, wherein performing said tree transformation pattern operation on said sentence comprises at least one of:
performing no operation; moving a node from one location to another location of said sub-tree; and
creating a new segment of the cumulative tree with given template.

20. The method of claim 1, wherein transforming said cumulative tree representation into a sentence of said target language comprises:
generating a sequence of words representing said sentence based on said cumulative tree representation, wherein said sequence of words is generated by in-order traversal of the leaves of said cumulative tree representation; and
converting said sequence of words into a sentence of said target language using said at least one sequence transformation rule, wherein said sequence transformation rule operates on the sequence of words.

21. The method of claim 1, wherein said sequence transformation rule comprises pattern to search, and at least one output operation, wherein said pattern to search consists of a regular expression matching at least one element of the sequence, and wherein output operation is at least one of substitution of a word or set of words in the sequence by another word, deletion of a word or set of words in the sequence, addition of at least one word to the sequence, and rearrangement of words in the sequence.

22. A device for picture based communication, the device comprising:
a user interface module connected to said processing module for:

presenting a plurality of pictures to a user on a screen of a device, receiving at least one picture selected by said user, and receiving at least one attribute of at least one picture selected by said user;

a processing module comprising:

a graph generation module connected to said processing module for constructing at least one connected graph in semantic interlingua, wherein said at least one connected graph is made of words and relationships with said selected at least one picture;

a sentence generation module for generating a sentence in at least one target language based on said at least one connected graph, said generation further comprising:

generating a graph representation from said connected graph in said semantic interlingua using at least one graph rule applied by a rule engine, generating separate tree representations for each node in said graph representation, wherein said tree representation is generated based on at least one graph-to-tree rule applied by said rule engine, and generating a cumulative tree representation based on said separate tree representations, wherein said separate tree representations are analyzed based on at least one graph to tree rule, and cumulative tree representation is analyzed by at least one tree rule, applied by said rule engine, wherein analyzing at least one graph further comprises:

traversing said graph representation node-by-node, wherein said graph representation is traversed from an entry node and proceeding outwards along edges, selecting edges in said graph representation from among those which create a cycle in the graph, or which cause an entry node to have at least one input edge, cause a node that is not an entry node to have two or more input edges, and cause a node to have more than one input edges of give type, forming said selected edges, breaking edges having a start node, an end node, and a relation; and transforming said cumulative tree representation into said sentence in said at least one target language, wherein said cumulative tree representation is transformed based on at least one sequence transformation rule applied by said rule engine; and an output module for communicating said sentence in said at least one target language to a party receiving said communication on said device in a mode as configured by the user, wherein said communicating comprises causing to display said sentence in said at least one target language on said screen of said device, wherein said at least one target language is based on an input representing mode of communication received from said user.

23. The device of claim 22, wherein said apparatus further comprises a prediction module for: predicting relations, words and attributes based on said sentence, wherein the prediction comprising:

determining feasible attributes to a selected word from said sentence, determining feasible relations to said selected word, and determining feasible words for at least one relation from said feasible relations, wherein said predicted relations, words, and attributes are presented to the user for further selection to construct a sentence.

24. The device of claim 22, wherein said graph representation comprises a plurality of graph nodes indicating at least one of a word sense with annotations, a set of attributes, a special identifier indicating a sub-graph, and a list of edges.

25. The device of claim 24, wherein each said graph node is associated with a dictionary entry, wherein said dictionary entry comprises at least one of root form of said word sense, morphological properties, parts of speech, semantic attributes, and framing structure.

26. The device of claim 22, wherein generating said graph representation from said connected graph in said semantic interlingua using at least one graph rule from the rule engine comprises:

enumerating all sub-graphs; creating an empty graph for each said sub-graph;

converting each unique node of an edge of the connected graph into a corresponding unique node of the graph representation;

converting each node of an edge into a unique node when either endpoints are pronouns, wherein each said edge comprises at least two nodes;

creating a map for mapping node identifiers to each said node;

setting an entry point for each sub-graph; and adding said edge as a relation to said two nodes.

27. The device of claim 22, wherein at least one of said word sense, annotations, set of attributes, special identifier indicating sub-graph, and list of edges associated with each said graph node in said graph representation defines a transformation of said graph node, wherein said graph node or graph structure is modified based on at least one graph rule.

28. The device of claim 27, wherein said graph rule comprises of a pattern that specifies that an attribute is one of, exactly one of, or a maximum of one of a given list of attributes.

29. The device of claim 27, wherein said graph rule comprises graph pattern, constraints on said pattern, and output operation.

30. The device of claim 22, wherein breaking an edge having a start node, an end node, and a relation comprises:

removing said relation from said graph representation; duplicating said end node of said edge;

marking said duplicate node with a pronoun attribute or a relative clause attribute, depending on whether the resulting graph is connected or a fragment;

connecting said duplicate node to said start node, wherein said edge is broken into said start node and said duplicate, and said end-node along with rest of said graph representation; and determining whether resulting graph representation is one of connected and broken into two fragments by the edge-breaking.

31. The device of claim 22, wherein said separate tree representation comprises:

a tree structure representing a syntactic structure for each graph node, wherein said tree structure comprises a maximal projection node, at least one of an intermediate projection node, and a head node;

pointers to children nodes; and properties for said tree representation.

32. The device of claim 22, wherein said separate tree representation comprises a trace pointer to another part, wherein said trace pointer to another part is represented by a trace maximal projection node.

33. The device of claim 22, wherein operations performed on said separate tree representation comprises at least one of initializing with a pattern, substitution of another separate tree representation, adjunction of another separate tree representation, detachment and movement of a sub-tree from one location to another using at least one movement rule, leaf traversal and application of a function to all the traversed leaves with accumulation of result of the function.

34. The device of claim 33, wherein said at least one movement rule comprises pattern to find source of movement, pattern to find destination of movement, and operation to be performed if both source and destination patterns are found.

35. The device of claim 34, wherein operation to be performed on cumulative tree representation if both source and destination patterns are found is one of:
movement of sub-tree to a given vacant node;
movement of head to a given head node;
copying properties from one tree structure to another;
setting properties on given tree structure;
removal of sub-tree; and
changing the word of a sub-tree.

36. The device of claim 22, wherein said at least one graph to tree rule is defined using at least one of an edge pattern in said graph representation, two node patterns in said graph representation, an output pattern in said tree representation, and an output variable in said tree representation.

37. The device of claim 22, wherein said at least one graph to tree rule is applied by traversing said graph representation in an order of edge types, and checking each said edge against a list of patterns of all possible graph to tree rules.

38. The device of claim 22, wherein said graph to tree rules pairwise coalesce separate tree representations associated with each graph node in said graph representation to create said cumulative tree representation that comprise all the sub-trees in various substitution and adjunction positions.

39. The device of claim 22, wherein said cumulative tree is transformed by:
searching for a pattern in said cumulative tree representation, wherein said pattern is in a given chain within the tree representation, and which matches given constraints on the pattern; and
performing a tree transformation operation on said sentence.

40. The device of claim 39, wherein performing said tree transformation pattern operation on said sentence comprises at least one of:
performing no operation;
moving a node from one location to another location of said sub-tree; and
creating a new segment of the cumulative tree with given template.

41. The device of claim 22, wherein transforming said cumulative tree representation into a sentence of said target language comprises:
generating a sequence of words representing said sentence based on said cumulative tree representation, wherein said sequence of words is generated by in-order traversal of the leaves of said cumulative tree representation; and
converting said sequence of words into a sentence of said target language using said at least one sequence transformation rule, wherein said sequence transformation rule operates on the sequence of words.

42. The device of claim 22, wherein said sequence transformation rule comprises pattern to search, and at least one output operation, wherein said pattern to search consists of a regular expression matching at least one element of the sequence, and wherein output operation is at least one of substitution of a word or set of words in the sequence by another word, deletion of a word or set of words in the sequence, addition of at least one word to the sequence, and rearrangement of words in the sequence.

* * * * *